US009829331B2

(12) United States Patent
McBride et al.

(10) Patent No.: US 9,829,331 B2
(45) Date of Patent: Nov. 28, 2017

(54) COMPUTER-AIDED ROUTE SELECTION

(71) Applicant: Strategic Design Federation W, Inc., Road Town, Tortola (VG)

(72) Inventors: Sandra Lynn McBride, University City, MO (US); Thomas Charles McBride, University City, MO (US)

(73) Assignee: Strategic Design Federation W, Inc. (VG)

( * ) Notice: Subject to any disclaimer, the term of this patent is extended or adjusted under 35 U.S.C. 154(b) by 0 days.

(21) Appl. No.: 14/686,463

(22) Filed: Apr. 14, 2015

(65) Prior Publication Data

US 2015/0219465 A1    Aug. 6, 2015

Related U.S. Application Data

(63) Continuation of application No. 14/028,889, filed on Sep. 17, 2013, now Pat. No. 9,008,967, which is a continuation of application No. 13/073,392, filed on Mar. 28, 2011, now Pat. No. 8,538,693, which is a continuation of application No. 11/533,444, filed on Sep. 20, 2006, now abandoned, which is a
(Continued)

(51) Int. Cl.
| | |
|---|---|
| *G01C 21/00* | (2006.01) |
| *G01C 21/34* | (2006.01) |
| *G01C 21/20* | (2006.01) |
| *G01C 21/36* | (2006.01) |
| *G09B 29/10* | (2006.01) |

(52) U.S. Cl.
CPC ......... *G01C 21/3484* (2013.01); *G01C 21/00* (2013.01); *G01C 21/20* (2013.01); *G01C 21/3423* (2013.01); *G01C 21/3461* (2013.01); *G01C 21/3664* (2013.01); *G01C 21/3676* (2013.01); *G09B 29/106* (2013.01)

(58) Field of Classification Search
CPC ..... G01C 21/20; G01C 21/34; G01C 21/3614
USPC ................................. 701/418, 423, 532, 533
See application file for complete search history.

(56) References Cited

U.S. PATENT DOCUMENTS

| | | |
|---|---|---|
| 5,543,789 A | 8/1996 | Behr |
| 5,559,707 A | 9/1996 | DeLorme |
| 5,648,768 A | 7/1997 | Bouve |
| (Continued) | | |

OTHER PUBLICATIONS

USA Track & Field—America's Running Routes—Map it. Accessed at: <http://www.usatf.org/routes/map/> (printed Feb. 21, 2006). 1 pg.
(Continued)

*Primary Examiner* — Thomas G Black
*Assistant Examiner* — Wae Louie
(74) *Attorney, Agent, or Firm* — The Belles Group, P.C.

(57) ABSTRACT

In some aspects, a processor may receive a starting point and an ending point from a runner. The processor may receive calorie information from the runner. The processor may receive pace information from the runner. The processor may receive a mile marker input from the runner. The processor may display a he route based on the starting point and the ending point. The processor may display the number of calories burned based on the route and the calorie information. The processor may display a pace of running the route based on the route and the calorie information. The processor may display a mile marker on the route in response to the first mile marker input.

17 Claims, 27 Drawing Sheets

Related U.S. Application Data continuation-in-part of application No. 11/324,549, filed on Jan. 3, 2006, now Pat. No. 7,706,973.

(56) References Cited

U.S. PATENT DOCUMENTS

| | | | |
|---|---|---|---|
| 5,802,492 A | 9/1998 | DeLorme | |
| 6,013,007 A | 1/2000 | Root et al. | |
| 6,067,499 A | 5/2000 | Yagyu et al. | |
| 6,188,957 B1 | 2/2001 | Bechtolsheim et al. | |
| 6,208,934 B1 | 3/2001 | Bechtolsheim et al. | |
| 6,259,990 B1 | 7/2001 | Shojima | |
| 6,278,942 B1 | 8/2001 | McDonough | |
| 6,314,367 B1 | 11/2001 | Ohler et al. | |
| 6,317,686 B1 | 11/2001 | Ran | |
| 6,321,158 B1 | 11/2001 | DeLorme | |
| 6,374,182 B2 | 4/2002 | Bechtolsheim et al. | |
| 6,381,537 B1 | 4/2002 | Chenault et al. | |
| 6,411,896 B1 | 6/2002 | Shuman et al. | |
| 6,446,002 B1 | 9/2002 | Barton | |
| 6,498,982 B2 | 12/2002 | Bellesfield | |
| 6,640,187 B1 | 10/2003 | Chenault et al. | |
| 6,826,472 B1 | 11/2004 | Kamei | |
| 6,837,827 B1* | 1/2005 | Lee | A63B 24/0084 482/3 |
| 7,149,626 B1 | 12/2006 | Devries et al. | |
| 7,162,363 B2* | 1/2007 | Chinitz | G01C 21/3476 340/995.19 |
| 7,215,034 B2 | 5/2007 | Hino et al. | |
| 7,216,034 B2* | 5/2007 | Vitikainen | G01C 21/32 701/426 |
| 7,248,966 B2 | 7/2007 | Devries et al. | |
| 7,266,447 B2 | 9/2007 | Bauer et al. | |
| 7,460,953 B2* | 12/2008 | Herbst | G01C 21/3638 340/995.19 |
| 7,487,041 B2 | 2/2009 | Devries et al. | |
| 7,627,423 B2* | 12/2009 | Brooks | G01C 21/34 340/995.19 |
| 7,706,973 B2* | 4/2010 | McBride | G01C 21/20 340/988 |
| 7,788,028 B2* | 8/2010 | Matsuoka | G01C 21/3614 340/988 |
| 7,822,547 B2 | 10/2010 | Lindroos | |
| 7,840,347 B2* | 11/2010 | Noguchi | G01C 21/3614 340/995.2 |
| 2001/0025221 A1 | 9/2001 | Klein | |
| 2001/0025222 A1 | 9/2001 | Bechtolsheim et al. | |
| 2003/0182052 A1 | 9/2003 | DeLorme | |
| 2005/0250458 A1 | 11/2005 | Graham et al. | |
| 2006/0002590 A1 | 1/2006 | Borak | |
| 2006/0004513 A1 | 1/2006 | Bauer et al. | |
| 2006/0136173 A1 | 6/2006 | Case et al. | |
| 2007/0010941 A1 | 1/2007 | Marsh | |
| 2007/0079691 A1 | 4/2007 | Turner | |
| 2007/0106466 A1* | 5/2007 | Noguchi | G01C 21/3614 701/418 |
| 2007/0106468 A1 | 5/2007 | Eichenbaum et al. | |
| 2007/0156335 A1* | 7/2007 | McBride | G01C 21/20 701/533 |
| 2008/0051993 A1 | 2/2008 | Graham et al. | |
| 2008/0058971 A1 | 3/2008 | Graham et al. | |
| 2008/0065319 A1 | 3/2008 | Graham et al. | |
| 2008/0103689 A1 | 5/2008 | Graham et al. | |
| 2011/0115721 A1* | 5/2011 | Li | G06F 3/04883 345/173 |
| 2011/0172902 A1* | 7/2011 | McBride | G01C 21/20 701/532 |
| 2011/0188071 A1* | 8/2011 | Yoshida | G06F 3/03545 358/1.15 |
| 2013/0096829 A1* | 4/2013 | Kato | G01C 21/32 701/533 |

OTHER PUBLICATIONS

"America's Running Routes to serve as the largest searchable database of running routes in the U.S." USA Track & Field—News. Accessed at: <http://www.usatf.org/news/view.aspx?DUID=USATF_2005-12-01-06-45-57> (printed Feb. 21, 2006). 1 pg.

USA Track & Field—America's Running Routes. Accessed at: <http://www.usatf.org/routes/> (printed Feb. 21, 2006). 1 pg.

"About Us." MapMyRun.com. Accessed at: <http://mapmyrun.com/> (printed Feb. 21, 2006) 1 pg.

http://walkingguide.mapmyrun.com/about.php (printed Feb. 21, 2006).

Gmaps Pedometer. Accessed at: <http://www.gmap-pedometer.com/> (printed Feb. 21, 2006). 4 pgs.

Gmaps Pedometer Change History. Accessed at: <http://www.gmap-pedometer.com/changeHistory.html> (printed Feb. 21, 2006). 2 pgs.

WalkJogRun. Accessed at: <http://www.walkjogrun.net> (printed Sep. 16, 2006). 4 pgs.

WalkJogRun Blog. Accessed at: <http://www.walkjogrun.net/blog> (printed Sep. 16, 2006). 3 pgs.

MapMyRun—About Us. Accessed at: <http://mapmyrun.com/about.php> (printed Sep. 29, 2006). 2 pgs.

MapMyRun. Accessed at: <http://mapmyrun.com/> (printed Sep. 29, 2006). 2 pgs.

* cited by examiner

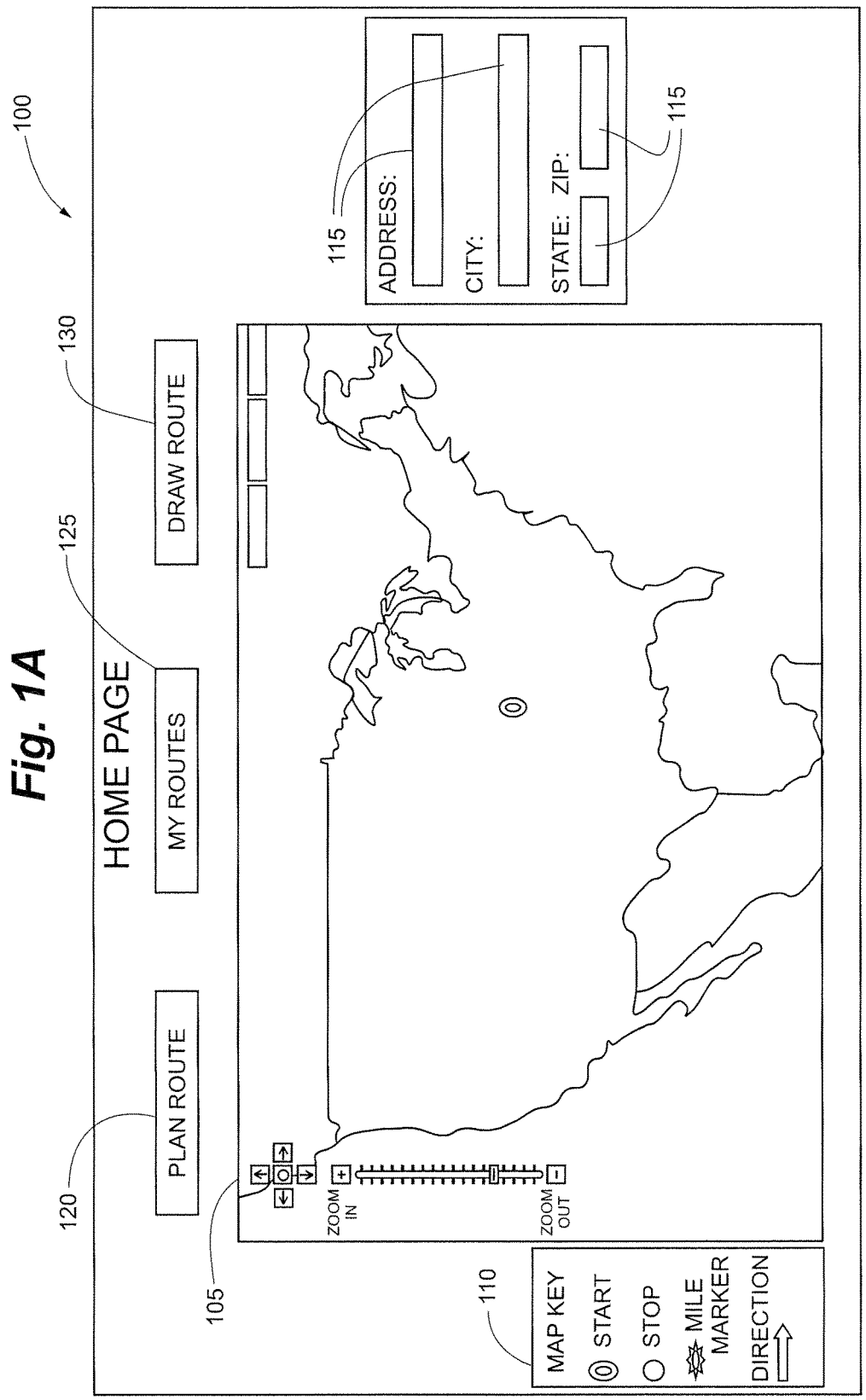

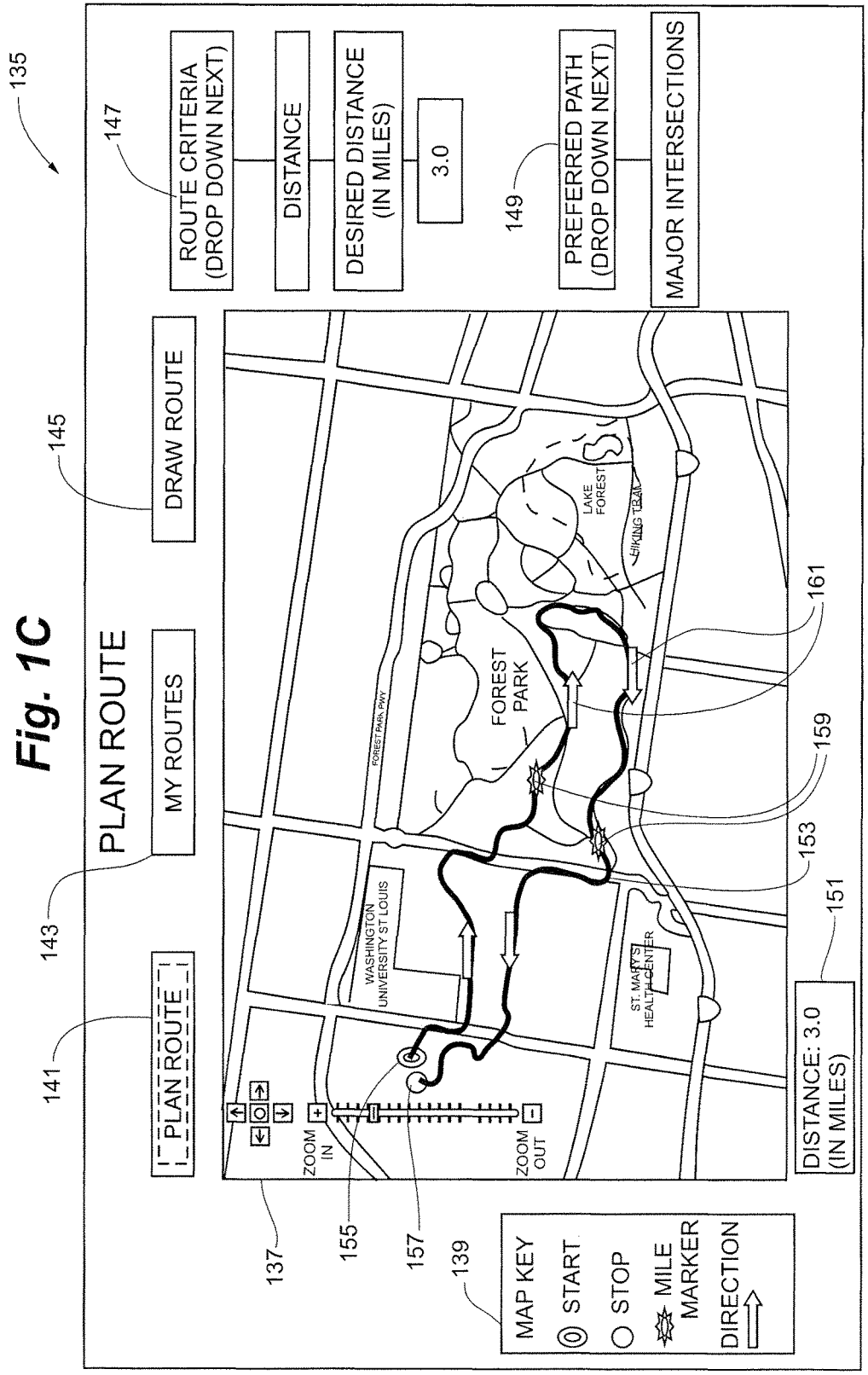

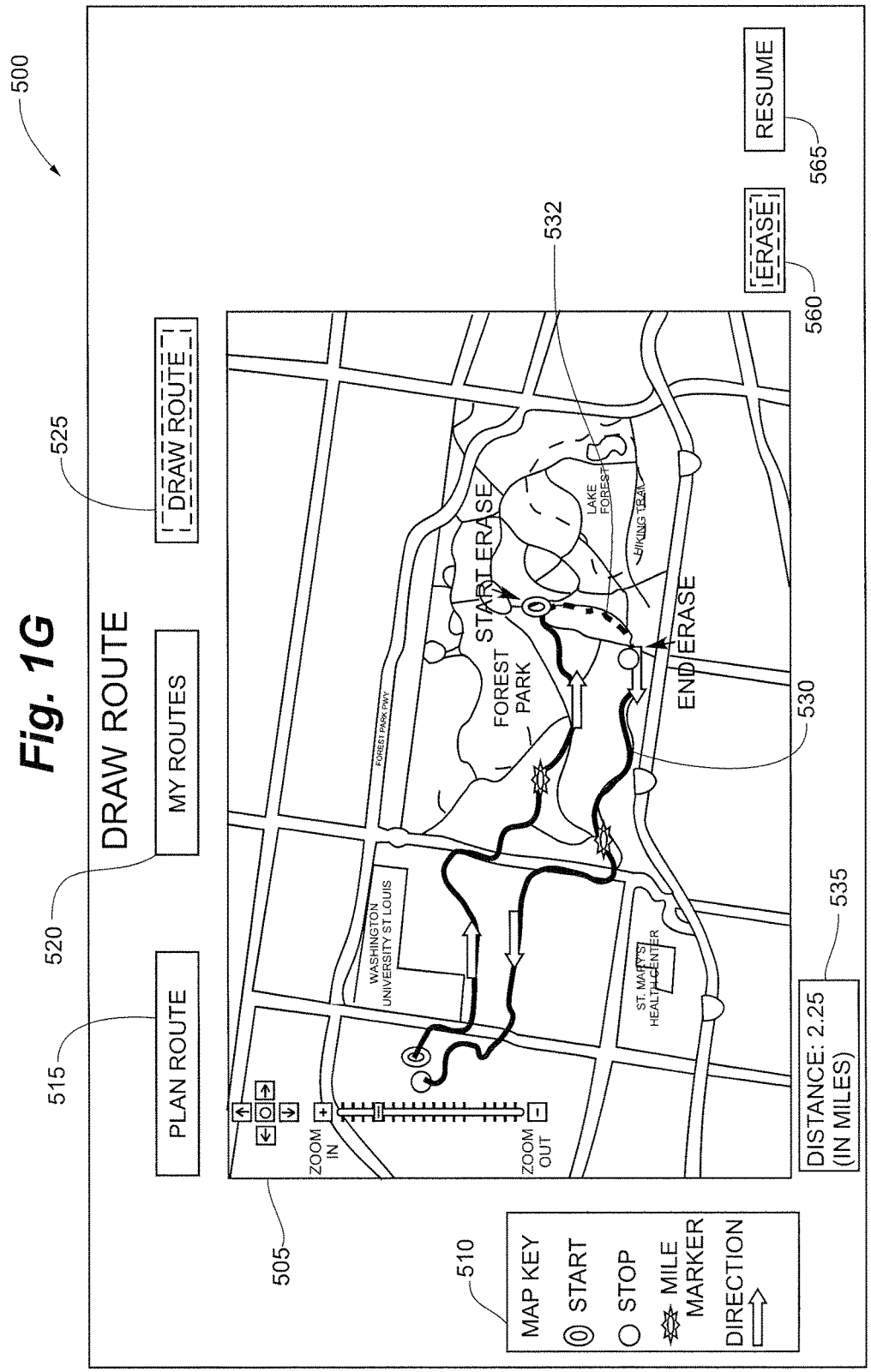

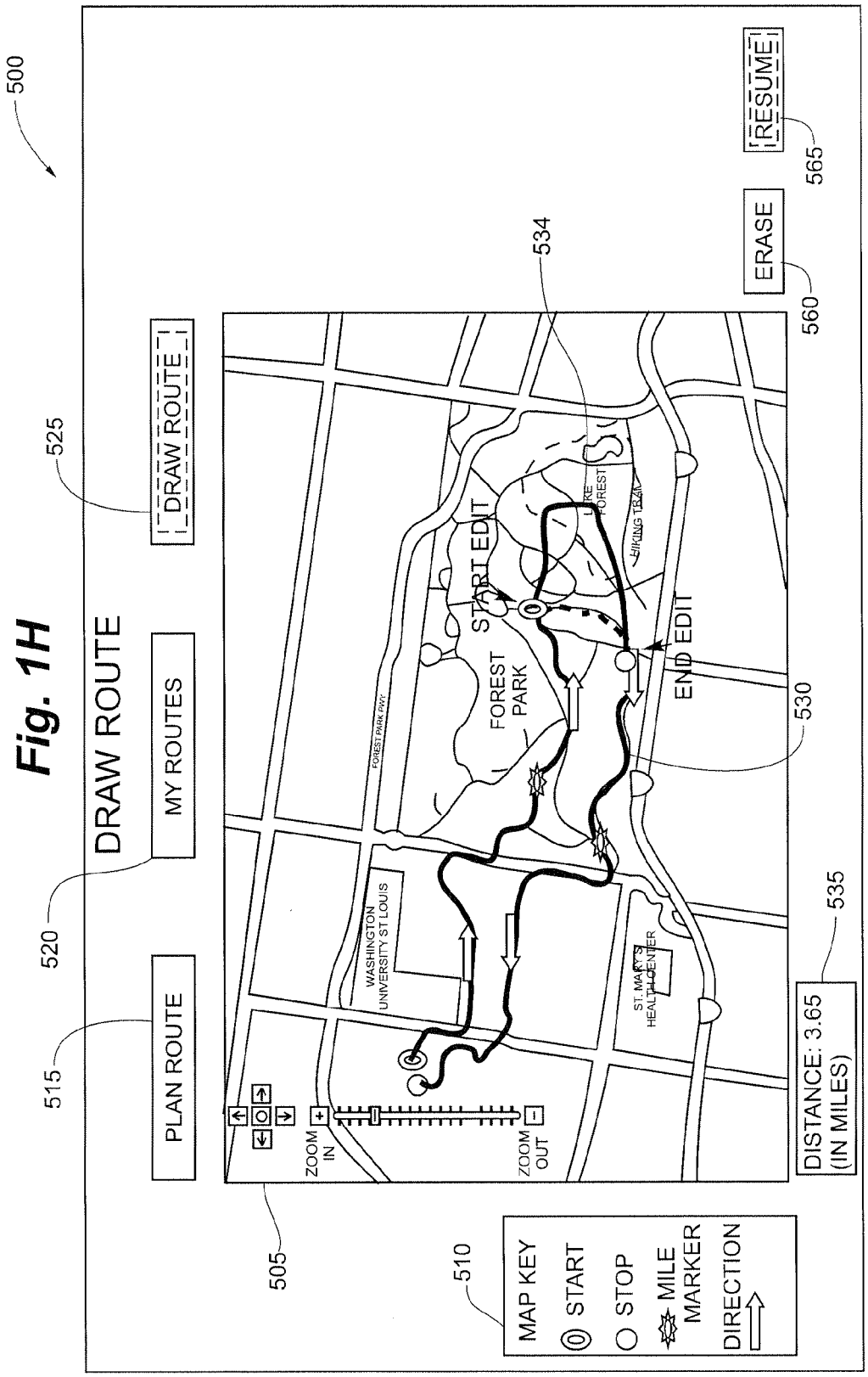

COMPUTER-AIDED ROUTE SELECTION

CROSS-REFERENCE TO RELATED APPLICATION

The present application is a continuation of U.S. patent Ser. No. 14/028,889 (now U.S. Pat. No. 9,008.967), filed Sep. 17, 2013, which is a continuation of U.S. Patent Ser. No. 13/073,392 (now. U.S. Pat. No. 8,538,693), filed Mar. 28, 2011, which is a continuation of U.S. patent application Ser. No. 11/533,444 (now abandoned), filed Sep. 20, 2006, which is continuation-in-part of U.S. patent application Ser. No. 11/324,549 (now U.S. Pat. No. 7,706,973), filed on Jan. 3, 2006. The disclosures of the aforementioned priority documents are incorporated herein by reference in their entirety.

TECHNICAL FIELD

This document relates to providing routes, maps, and other information that correspond to preferences expressed by a user.

BACKGROUND

There are millions of miles of paths in the United States. Such paths include roads, sidewalks, hiking trails, bike trails, and so on. Many of such paths are captured in various maps. Maps showing the streets/highways located in a given area are common. But maps showing paths like bike trails and hiking trails also exist in a variety of forms. Many people are familiar with paper maps, which have been available for many years. Relatively recently, electronic maps have emerged as a viable source for viewing several types of paths.

People travel by a wide variety of means. Examples of such means include running, walking, hiking, biking, driving, and so on. Sometimes people travel for necessity, sometimes for physical fitness, and other times for recreation. Indeed, people travel for a whole host of additional reasons.

People who travel often consult maps. Sometimes, people consult maps before traveling in order to plan their travel routes. Sometimes, people consult maps after traveling in order to see where they have been and how far they have traveled. People can gain valuable information about their travel by consulting maps.

In addition to maps, people often consult other sources of information in making travel plans. For example, people may seek information related to weather, road construction, landmarks, and various other items of information. To gather this other information, people may be required to consult several sources.

SUMMARY

In one aspect, the invention features a system for assisting a user in selecting a route. The system may include a request receiving module. The request receiving module may be configured to receive a route request including map information and route information entered by a user. The map information may be selected from the group consisting of a starting point, an ending point, a landmark point, and combinations thereof. The route information may be selected from the group consisting of (1) lighting criteria, (2) travel surface criteria, (3) population density criteria, (4) weather criteria, (5) distance criteria, (6) speed criteria, (7) calorie criteria, (8) time criteria, (9) elevation change criteria, (10) landmark criteria, and combinations thereof. In some cases, the route information may be selected from the group consisting of lighting criteria, weather criteria, distance criteria, speed criteria, and calorie criteria. In one group of embodiments, the route information may include at least one of (and/or is selected from the group consisting of) the above-noted items (1), (4), and (7). In other embodiments, the route information may include at least one of (and/or is selected from the group consisting of) items (2), (5), (6), (7), and (8). In some other groups of embodiments, the route information may include at least item (7). In another case, the route information may include at least one of (and/or is selected from the group consisting of) items (5), (6), (7), and (8). The system may include a map retrieving module that is configured to retrieve a map based on the map information. The system may include a route providing module that is configured to provide one or more selected routes on the map based on the route information. The system may include a display providing module to provide the one or more selected routes and the map for display to the user.

In a second aspect, the invention features a computer-readable medium programmed with instructions for performing a method of assisting a user in selecting a route. The medium may comprise instructions for causing a programmable processor to receive a route request including map information and route information entered by a user. The medium may comprise instructions for causing a programmable processor to retrieve a map based on the map information. The medium may comprise instructions for causing a programmable processor to provide one or more selected routes on the map based on the route information. The medium may comprise instructions for causing a programmable processor to provide the one or more selected routes and the map for display to the user.

In a third aspect, the invention features a system for providing users multiple route selection modes. The system may include a parameter module that is configured to generate one or more parameter-based routes based on one or more route parameters. The system may include a trace module that is configured to generate one or more traced routes based on input received via tracing an input instrument on a touch-sensitive screen. The system may include a storage module configured to retrieve one or more stored routes from a storage repository. The system may include a request processing module configured to receive a route request from a user and to provide the route request to at least one of the parameter module, the trace module, and the storage module that the request processing module determines is equipped to provide responsive information. In some embodiments, the system may include a display module that is configured to collect responsive information from the parameter module, the trace module, and/or the storage module, and to provide the responsive information to the user for display. In some embodiments, the system may include an editing module to allow the user to edit the responsive information after the display module provides the responsive information to the user for display.

Implementations may include one or more of the following features. For example, a system may include an editing module to allow the user to edit the one or more selected routes after the display providing module provides the one or more selected routes and the map for display. Editing instructions may be entered by the user (e.g., via tracing an input instrument along a display, such as a touch-sensitive display). The one or more selected routes may be modified based on the editing instructions, thereby creating one or more modified routes. The one or more modified routes and the map may be provided for display to the user. Selected route information corresponding to the one or more selected routes may be provided. The selected route information may include a distance of the one or more selected routes. The selected route information may include traveling directions corresponding to the one or more selected routes. The route providing module may comprise a route selection module configured to identify one or more potential routes may be identified based on a first route information item, and then one or more selected routes may be identified by identifying which of the one or more potential routes satisfy a second route information item.

Embodiments of the present invention may have one or more of the following advantages. In some embodiments, users may be able to learn precise distance calculations of a route before or after traveling the route. In some embodiments, users may be able plan routes based on a multitude of criteria. In some embodiments, users may be able to download selected routes to, e.g., an mp3 player. In some embodiments, users will have flexibility to use a stylet or mouse to draw, erase, or edit routes while viewing the exact distance of the route in real time.

In any aspect or embodiment of the present invention, the route may include at least one portion that does not follow the highway, road, or street (e.g., a portion of the route can optionally follow a path that is an automobile-prohibited path, and/or an unpaved path).

In certain embodiments, the invention may comprise a system (optionally a website) adapted to select a display on a map one or more routes based on input from operator. The input preferably includes map information selected from the group consisting of a starting point, an ending point, a landmark point (past which the route is to extend), together with route information selected from items (1) through (10) above. Optionally, the input route information includes at least item (7). In some cases, the input route information includes at least one of (and/or is selected from the group consisting of) items (2), (5), (6), (7), and (8), or items (1), (4), and (7), or items (5), (6), (7), and (8). In certain related method embodiments, and operator inputs the noted items and receives one or more routes displayed on a screen (e.g., a monitor) in response to entering the noted input.

In some aspects, a computer-readable medium may cause a processor to receive a starting point and an ending point from a runner. The processor may receive calorie information from the runner. The processor may receive pace information from the runner. The processor may receive a mile marker input from the runner. The processor may display the route based on the starting point and the ending point. The processor may display the number of calories burned based on the route and the calorie information. The processor may display a pace of running the route based on the route and the calorie information. The processor may display a mile marker on the route in response to the first mile marker input.

In some aspects, a computer-readable medium may cause a processor to receive personal information input, a route input, and a travel mode input from a traveler. The processor may calculate a fluid loss value based on the personal information input, the route input, and the first travel mode input. The processor may calculate a calories burned value based on the personal information input, the route input, and the first travel mode input. The processor may cause the fluid loss value to be displayed to the traveler. The processor may cause the calories burned value to be displayed to the traveler. The processor may cause a fluid loss marker to be displayed to the traveler. The fluid loss marker may indicate that the traveler will need a certain amount of fluid at a certain point on the route in order to restore fluid levels. The processor may cause a calories burned marker to be displayed to the traveler. The calories burned marker may indicate that the traveler will have burned a certain number of calories at a certain point on the route. The processor may cause a mile marker to be displayed to the traveler. The mile marker may indicate that the traveler will have traveled a certain distance at a first certain point on the route.

BRIEF DESCRIPTION OF THE DRAWINGS

FIG. 1A shows an exemplary display.
FIG. 1C shows an exemplary display.
FIG. 1G shows an exemplary display.
FIG. 1H shows an exemplary display.

DETAILED DESCRIPTION OF ILLUSTRATIVE EMBODIMENTS

Figure 1B:
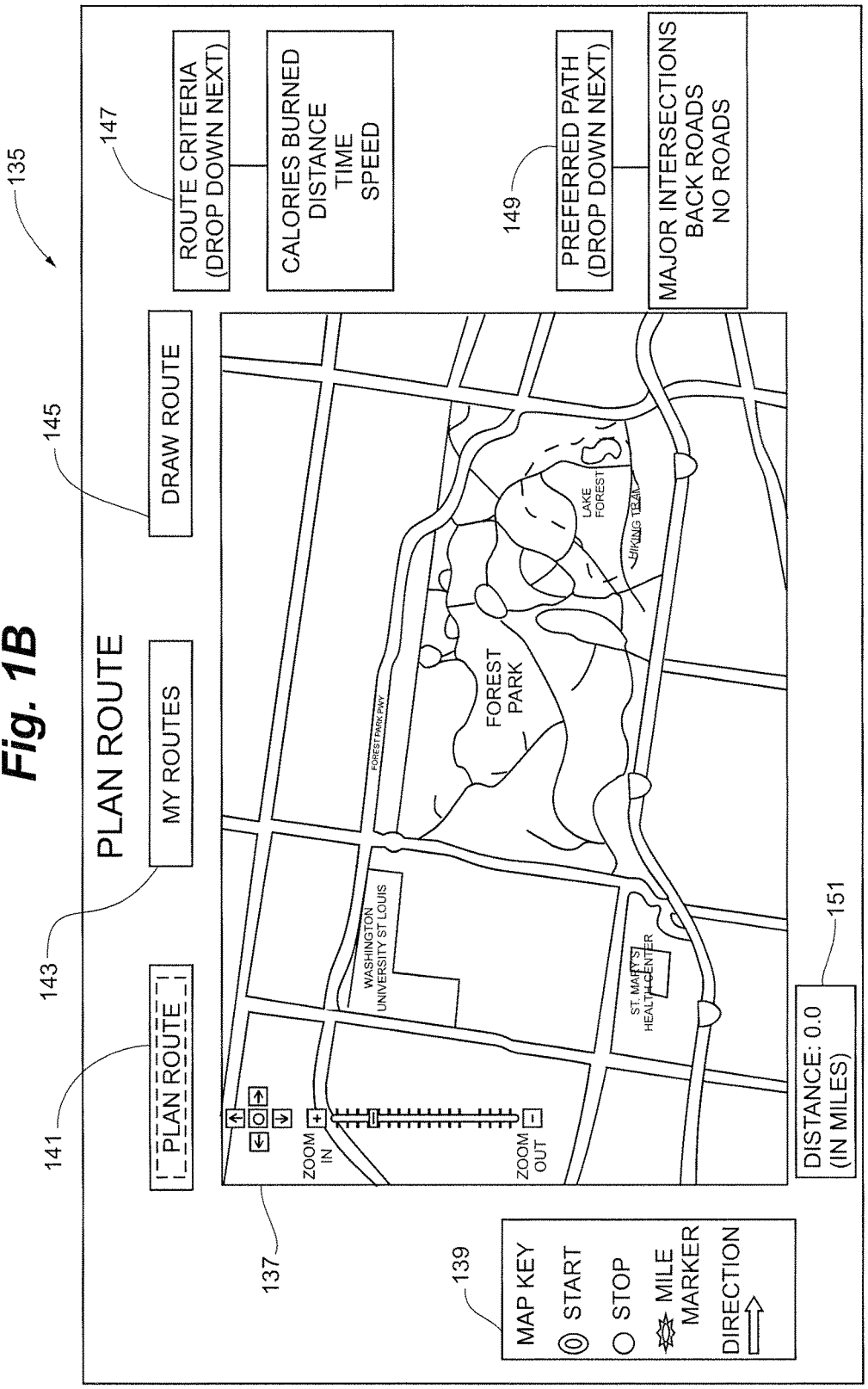
FIG. 1B shows an exemplary display.

FIG. 1A shows an exemplary display 100 that may be implemented in some embodiments of the present invention. In some embodiments, the display 100 may be the first page a user encounters. In some embodiments, the display 100 may be the home page of a website. The display 100 may include a map 105. The map 105 may include various kinds of information, such as geopolitical borders, topographical information, highways, updated weather for a selected area, or any other kind of information typically provided by maps. The display 100 may include a key 110 to provide information associated with the map 105. The key 110 may include explanations of various icons displayed on the map 105. Examples of such icons include a start icon, a stop icon, a mile marker icon, and/or a direction icon. In some embodiments, such icons can be turned on or off by a user. The display 100 may include one or more input fields 115. The input fields 115 may allow users to retrieve appropriately focused maps by entering corresponding information. Examples of input fields 115 may include fields for street addresses, cities, states, and/or zip codes. In some embodiments, other methods for retrieving appropriately focused maps may exist. For example, in some embodiments, a user may select an area of interest from the map 105 by clicking and dragging the start point (as indicated by the icon noted in the key 110) to a specific area of the map using an input device such as a mouse or a stylus.

The display 100 of FIG. 1A may include one or more icons that correspond to route selection modes. The display 100 may include a "plan route" icon 120. Selecting the "plan route" icon 120 may allow a user to select a route by entering various parameters and choosing between displayed routes that satisfy one or more of those parameters. The exemplary system discussed in connection with FIGS. 4-6 may assist users in selecting routes in this manner. The display 100 may include a "my routes" icon 125. Selecting the "my routes" icon 125 may allow a user to select a previously stored route. The exemplary system discussed in connection with FIG. 7 may assist users in selecting routes in this manner. The display may include a "draw route" icon 130. The "draw route" icon may allow a user to select a route by providing input through tracing, for example, a stylet or a mouse along the display 100. (It will be appreciated that the mouse may actually be moved along a nearby surface, such as a mouse pad, while a mouse-position indicator moves along the display according to the manner in which an operator physically moves the mouse. The trackball, trackpad, trackbutton, or another cursorcontrol/tracing device can optionally be used in a similar way.) In some embodiments, the exact distance of a displayed route or part of a route may be displayed on a constant basis. In one embodiment, as a route is being drawn, a distance is displayed, and this distance increases as more and more of the route is drawn. For example, as a tracing step is carried out, a visual indicator (a dotted line, solid line, etc.) showing the traced the path can be shown on the display, and as the line or other indicator gets longer, the displayed distance increases in a corresponding manner. The exemplary system discussed in connection with FIGS. 3 and 8 may assist users in selecting routes in a "draw route" manner.

Figure 2:
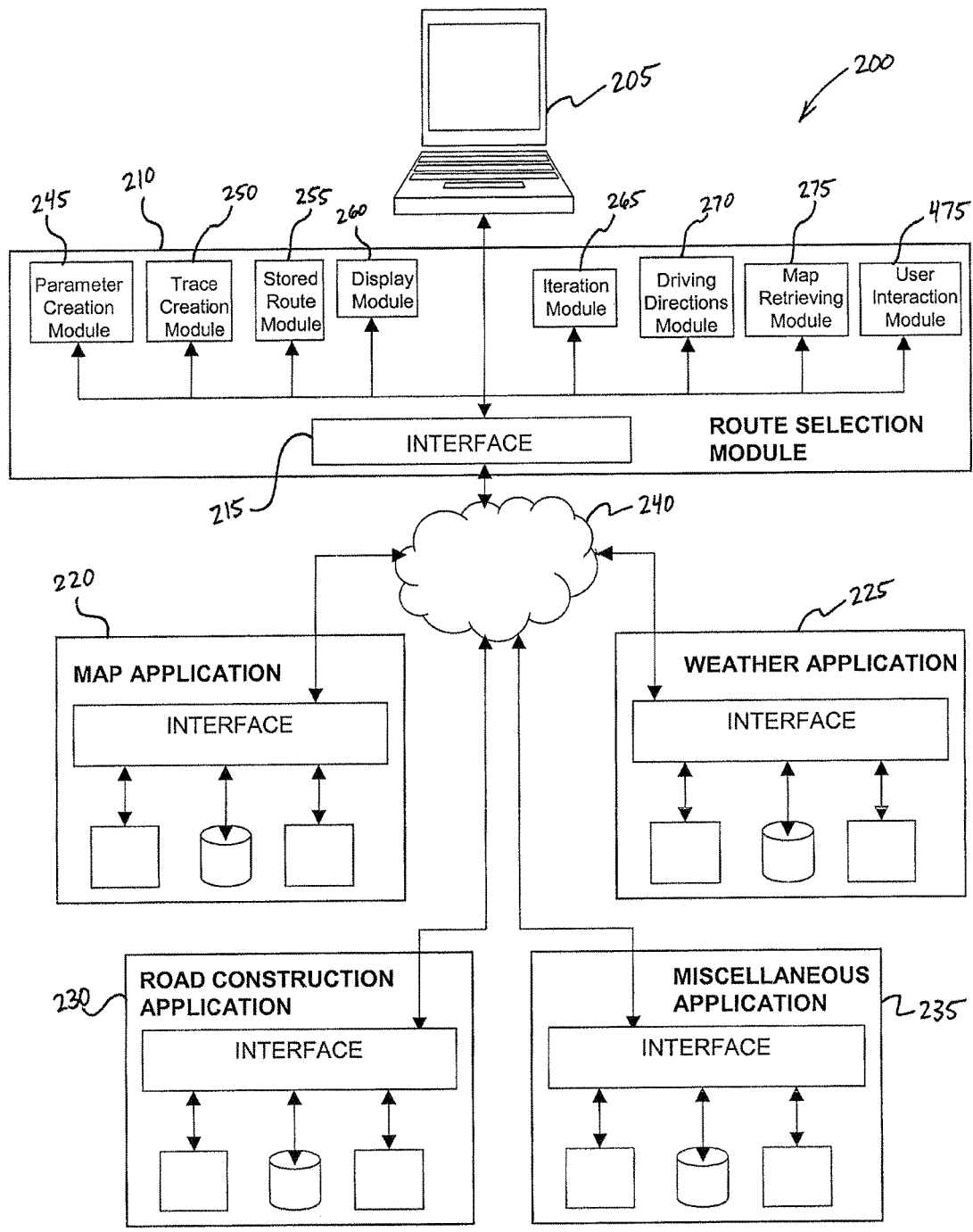
FIG. 2 shows a block diagram of an exemplary route selection system.

FIG. 2 shows an exemplary route selection system 200 to assist a user in selecting a route to be traveled by, e.g., running, walking, hiking, biking, driving, and so on. The route selection system 200 may include multiple components to assist in performing this function The route selection system 200 may include a computer 205. The computer 205 may allow a user to interact with the route selection system 200. The route selection system 200 may include multiple computers, allowing multiple users to interact with the route selection system 200. Users may provide input to the computer 205 by a keyboard and/or a pointing device (e.g., a mouse or a trackball). In some embodiments, users may provide input to the computer 205 by other means, such as acoustic, speech, or tactile input.

The route selection system 200 may include a route selection module 210 to retrieve maps, perform calculations, create displays, and/or perform several other functions in providing assistance to users in selecting routes. The route selection module 210 may include an interface 215 to handle at least some of the communication of the route selection module 210. For example, the route selection module 210 may communicate with the computer 205 via the interface 215. The route selection module 210 may communicate with other applications via the interface 215. Such applications may include a map application 220, a weather application 225, a road construction application 230, and other miscellaneous applications 235. The route selection module 210 may communicate with such applications 220, 225, 230, 235 directly. The route selection module 210 may communicate with such applications 220, 225, 230, 235 via a network 240. The network 240 may be, for example, the Internet. Thus, one or more of the noted application types 220, 225, 230, 235 may be a web page (e.g., a mapping web page, a weather forecasting web page, a road construction status web page, etc.).

Additional components may be included in the route selection module 210. For example, the route selection module 210 may include a parameter creation module 245 to generate one or more routes based on parameters provided by a user. The route selection module 210 may include a trace creation module 250 to allow a user to generate a route by providing input through tracing, for example, a stylet or a mouse on a screen of the computer 205. The route selection module 210 may include a stored route module 255 to store newly created routes in the memory of the route selection module 210 and to provide, in response to a user request, a route that has been stored. The route selection module 210 may include a display module 260 to collect various information from the components of the route selection module 210 and generate a display to be transmitted to and displayed on the computer 205. The route selection module 210 may include an iteration module 265 assist the parameter creation module 245 in generating a route corresponding to parameters provided by a user. The route selection module 210 may include a driving directions module 270 to provide driving directions corresponding to the selected route. The route selection module 210 may include a map retrieving module 275 to retrieve one or more maps in response to user input and to provide a single suitable map to appropriate components. The route selection module 210 may include a user interaction module 475 to perform various functions in interacting with users. The route selection module 210 may include other components to perform functions or to gather or provide information in order to assist a user in selecting a route to be traveled.

The route selection system 200 shown in FIG. 2 includes several components. Route selection systems may include a greater or lesser number of components. For example, any combination of the noted modules may be present in a given embodiment. In route selection system embodiments, the functions performed by multiple components in the route selection system 200 discussed herein may be combined into fewer components, such as one component. For example, the multiple functions performed by the parameter creation module 245 and the iteration module 265 discussed herein may be performed by a single component. In some route selection system embodiments, the functions performed by one component in the route selection system 200 discussed herein may be performed by multiple components. For example, the multiple functions of the display module 260 discussed herein may be performed by, e.g., a route display component, a tracing feedback component, and other miscellaneous components. Some route selection system embodiments may include additional components to provide additional functionality. For example, a component may be provided that is dedicated to maintaining journals, workout plans, travel itineraries, and/or other miscellaneous information. Components of route selection systems may perform the functions discussed herein in various ways. The ways by which the components of the route selection system 200 discussed herein are provided only for illustration.

Figure 3:
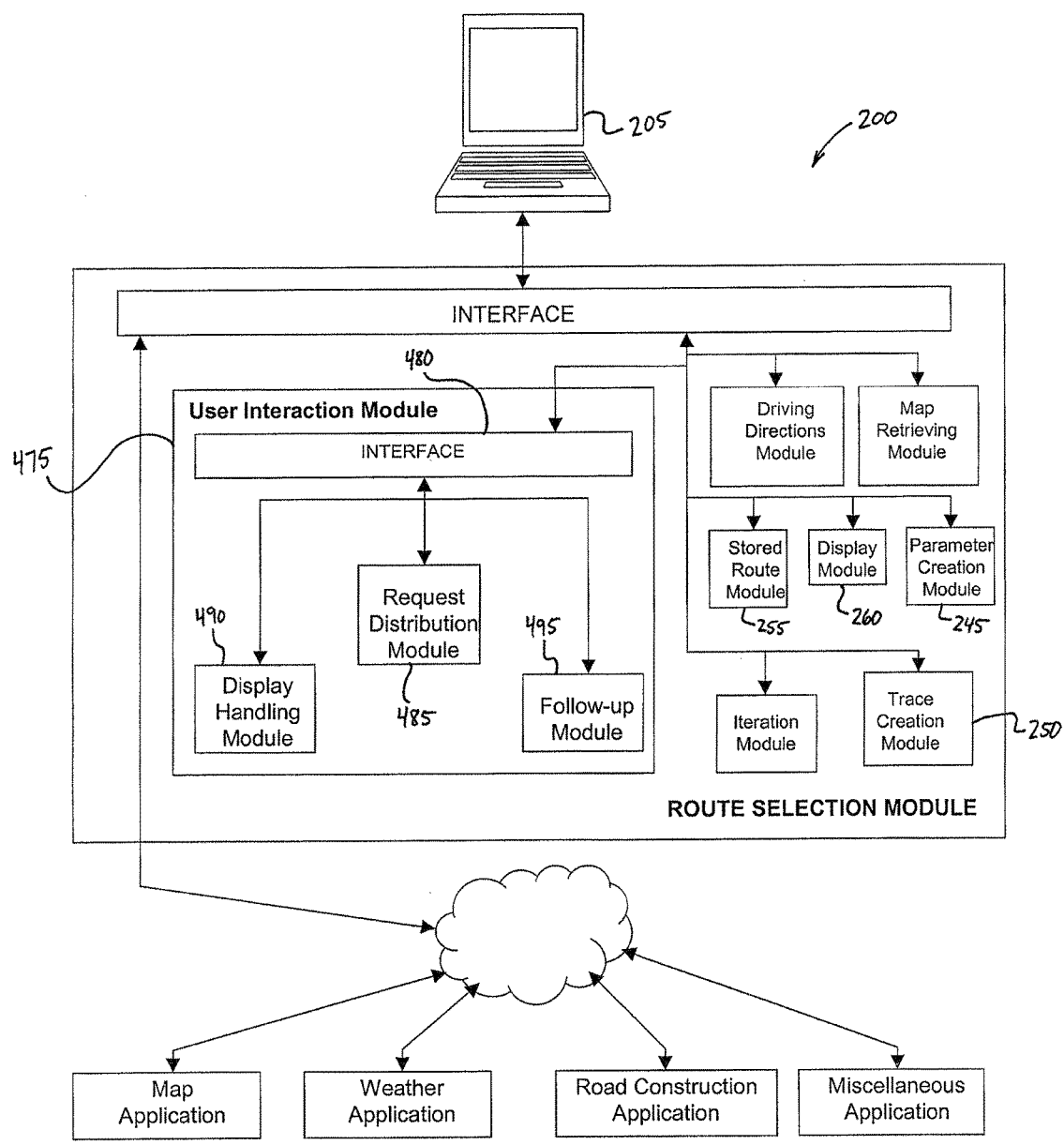
FIG. 3 is a block diagram of the exemplary route selection system of FIG. 2, with one component (a user interaction module) shown in greater detail.

FIG. 3 shows the route selection system 200 of FIG. 2 with the user interaction module 475 shown in greater detail. The user interaction module 475 may include multiple components to receive input provided by users, to direct requests received from users to the proper component(s) of the route selection system 200, to receive responsive displays from the display module 260, to perform various calculations, to provide the displays to the user, and/or to perform various additional functions.

The user interaction module 475 may be responsible for receiving and processing various requests provided by the user from the computer 205 via an interface 480. The interaction module 475 may receive requests from the computer 205 at a request distribution module 485. The request distribution module 485 may assess which of multiple components would be equipped to respond to the user's request. For example, if the user requests routes based on entered parameters, the request distribution module 485 may provide the request to the parameter creation module 245. If the user requests a previously stored route, the parameter distribution module 485 may provide the request to the stored route module 255. If the user requests to trace a route, the parameter distribution module 485 may provide the request to the trace creation module 250. The request distribution module 485 may provide the request to other components if such components are equipped to play a role in providing responsive information.

Figure 4:
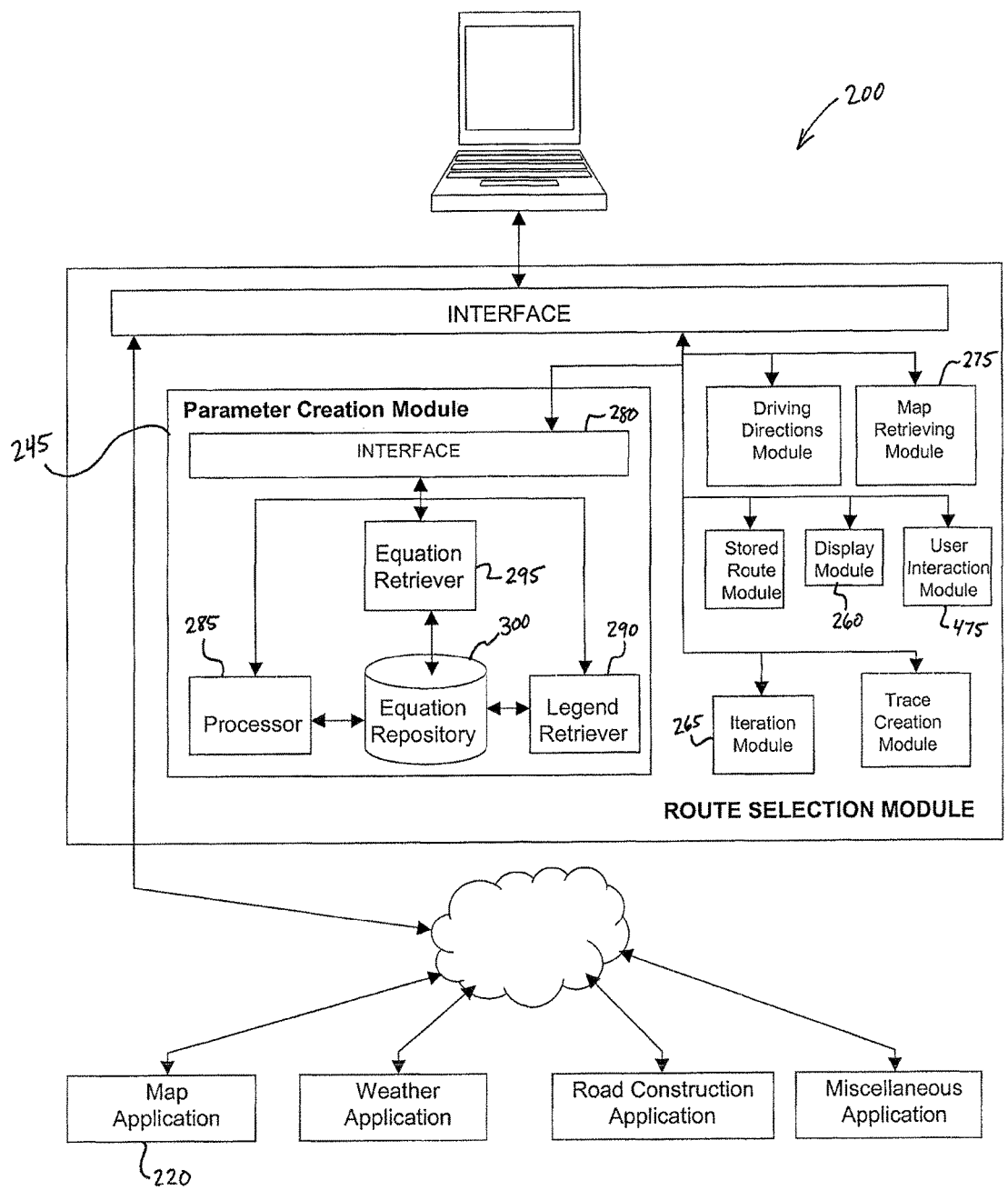
FIG. 4 is a block diagram of the exemplary route selection system of FIG. 2, with one component (a parameter creation module) shown in greater detail.

FIG. 4 shows the route selection system 200 of FIG. 2 with the parameter creation module 245 shown in greater detail. The parameter creation module 245 may include multiple components to generate one or more routes based on parameters provided by a user.

The parameter creation module 245 may be operable to assess the parameters entered by the user to determine whether they are sufficient to allow the route selection system 200 to function. The parameter creation module 245 may receive parameters from the user interaction module 475 at a processor 285 through an interface 280 Such parameters may include a variety of items related to a user's preferences in choosing a route. Examples of parameters/criteria include starting location, ending location, distance, amount of time, travel surface type (e.g., road, sidewalk, unpaved trail, etc.), number of calories to be burned, extent of elevation change (e.g., flat, hilly, total elevation change over route, etc.), pace (e.g., 7-minute miles), rate of speed, population density (e.g., big-city streets or country roads), lighting (e.g., lit or unlit), landmarks, and/or other parameters that may impact route selection. The processor 285 may determine whether the parameters entered provide enough information to enable the map retrieving module 275 to retrieve a map, e.g., from the map application 220 or to enable the processor 285 to select a route. If the processor 285 determines that the parameters entered do not provide enough information to enable the map retrieving module 275 to retrieve a map, the processor 285 may cause a notification to be displayed to the user, requesting additional information. For example, if the parameters included only distance, the processor 285 may cause a notification to be displayed to the user, requesting information such as starting location or ending location. If the processor 285 determines that the parameters entered do not provide enough information to enable processor 285 to select a route, the processor 285 may cause a notification to be displayed to the user, requesting additional information. For example, if the parameters included only a desired number of calories to be burned, the processor 285 may cause a notification to be displayed to the user, requesting information such as the user's weight.

If the processor 285 determines that the parameters entered provide enough information to enable the map retrieving module 275 to retrieve a map and to enable the processor 285 to select a route, the processor 285 may provide such parameters to the map retrieving module 275. The map retrieving module 275 may then retrieve a suitable map from, e.g., the map application 220 and provide the map to the iteration module 265.

Figure 5:
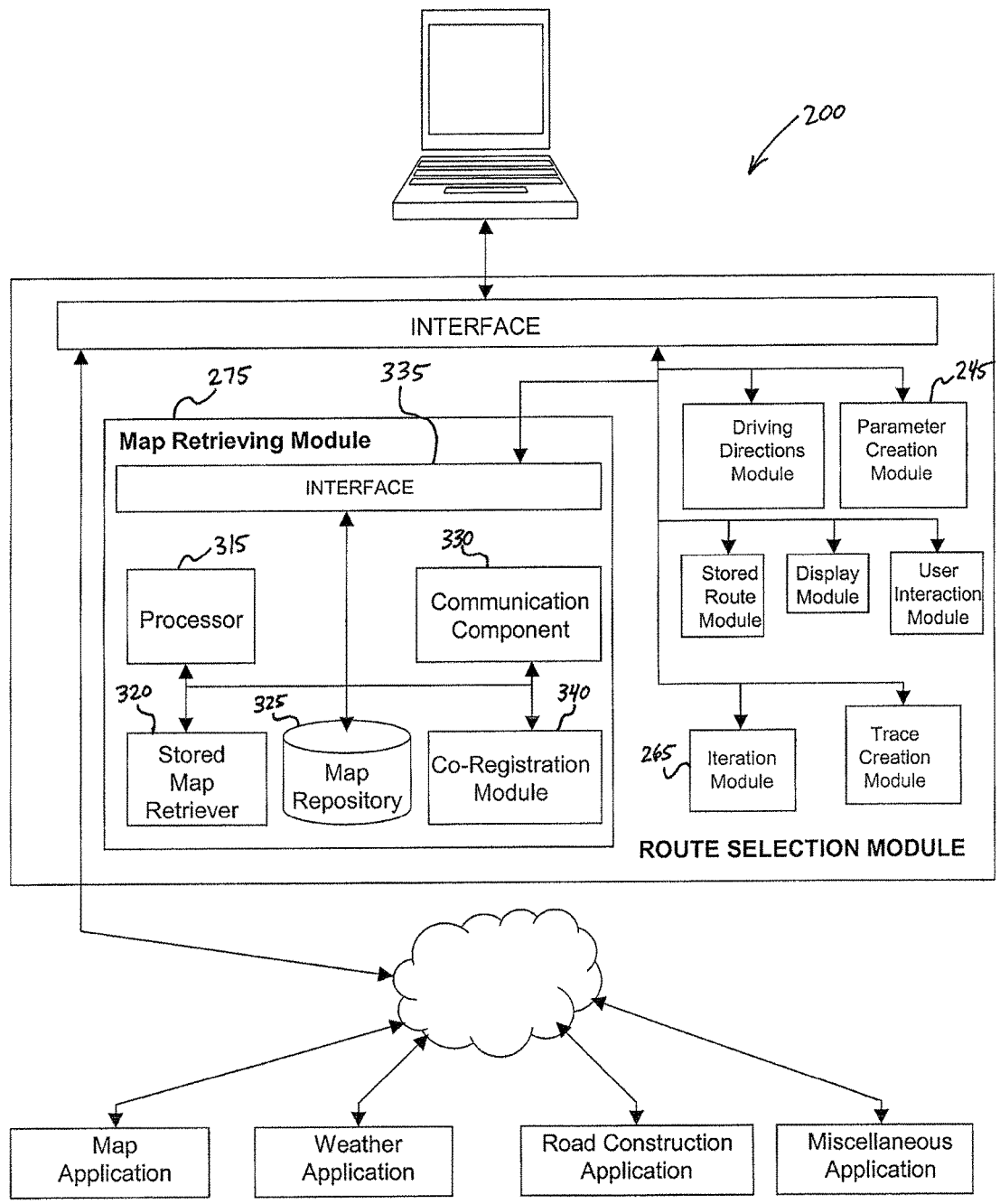
FIG. 5 is a block diagram of the exemplary route selection system of FIG. 2, with one component (a map retrieving module) shown in greater detail.

FIG. 5 shows the route selection system 200 of FIG. 2 with the map retrieving module 275 shown in greater detail. The map retrieving module 275 may include multiple components to retrieve one or more maps in response to user input, to co-register multiple maps into one suitable map if necessary, and to provide the suitable map to appropriate components. The term "maps," as used herein, is to be interpreted broadly and should encompass traditional maps, satellite photographs, hybrids (i.e., traditional maps shown in conjunction with satellite photographs), and other similar items. Commonly, the map will include some visual representation (a drawing, image, etc.) of a geographic area.

With parameters from the parameter creation module 245, the map retrieving module 275 may be operable to retrieve one or more maps. The map retrieving module 275 may receive parameters from the parameter creation module 245 at a processor 315. The processor 315 may provide the parameters to a stored map retriever 320, which may search for a map in a map repository 325 based on the parameters. If the stored map retriever 320 is able to find a suitable map in the map repository 325, the stored map retriever 320 may provide the map to the processor 315. The processor 315 may analyze the map to determine whether the map is indeed suitable. If the processor 315 determines that the map is suitable, the processor 315 may provide the map to a communication component 330. If the processor 315 determines that the map is unsuitable, the processor 315 may notify the stored map retriever 320 why the map is unsuitable and instruct the stored map retriever 320 to further search the map repository 325. In some instances, the stored map retriever 320 may be unable to find a suitable map in the map repository 325. In such instances, the stored map retriever 325 may so notify the processor 315. In the event that the stored map retriever 325 is unable to retrieve a suitable map, the processor 315 may determine whether to transmit a request for a suitable map to an external application, such as map application 220 (e.g., a mapping web page). The processor 315 may instruct communication component 330 to transmit a request to the map application 220. The communication component 330 may submit parameters to one or more external applications, possibly including the map application 220, through an interface 335. The communication component 330 may then receive one or more maps from the external application through the interface 335 (such as by downloading, or linking to, the one or more maps of the external application(s)).

The communications component 330 may be responsible for providing a single suitable map to one or more components, such as the iteration module 265. If multiple maps are received by the communication component 330, the communication component 330 may provide the maps to a co-registration module 340. The co-registration module 340 may co-register the multiple maps, overlaying the maps on top of one another such that a real-world location would be displayed in the same spot on a screen for each of the maps. Examples of when multiple maps may be co-registered include situations in which a user would like to see weather information (e.g., wind, temperature, rain, humidity, etc.) and road construction information for a selected route. In such situations, the communication component 330 may retrieve a map having the weather information from one external application and a map having the road construction information from a second external application. The communication component 330 may provide the two maps to the co-registration module 340 for co-registration. The co-registration module 340 may provide the co-registered map to the communication component 330. The communication component 330 may receive a suitable map from the stored map retriever 320, from an external application via the interface 335, from the co-registration module 340, or from other sources. The communication component 330 may provide the suitable map to one or more components, such as the iteration module 265.

In one particular embodiment, there is provided a time-animated map showing one or more remotes and the weather changes forecast for such route(s) over time. Thus, the operator can plan a 2-hour jogging route, and the mute can be animated (optionally based on a predicted running rate) so that the runner's location as a function of time is shown while at the same time, the forecasted weather changes are simultaneously shown as a function of time.

The map retrieving module 275 shown in FIG. 5 includes multiple components. Components designed to retrieve one or more maps in response to user input, to co-register multiple maps into one suitable map if necessary, and to provide the suitable map to appropriate components may include a greater or lesser number of components. In map retrieving module embodiments, the functions performed by multiple components in the map retrieving module 275 discussed herein may be combined into fewer components, such as one component. For example, the multiple functions performed by the processor 315 and communication component 330 discussed herein may be performed by a single component. In some map retrieving module embodiments, the functions performed by one component in the map retrieving module 275 discussed herein may be performed by multiple components. For example, the multiple functions of the processor 315 discussed herein may be performed by, e.g., a component dedicated to communicating with various other components, a component dedicated to performing calculations, and other miscellaneous components. Some map retrieving module embodiments may include additional components to provide additional functionality. For example, a component may be provided that is dedicated to selecting from among multiple external map applications based on preferences expressed by a user. Components of map retrieving modules may perform the functions discussed herein in various ways. The ways by which the components of the map retrieving module 275 discussed herein are provided only for illustration.

Referring again to FIG. 4, in order to generate a route based on parameters provided by a user, the parameter creation module 245 may retrieve information related to the map's legend from the iteration module 265. The processor 285 of the parameter creation module 245 may instruct a legend retriever 290 to retrieve such information from the iteration module 265. Such information may include a ratio of displayed distance to real-life distance.

Figure 6:
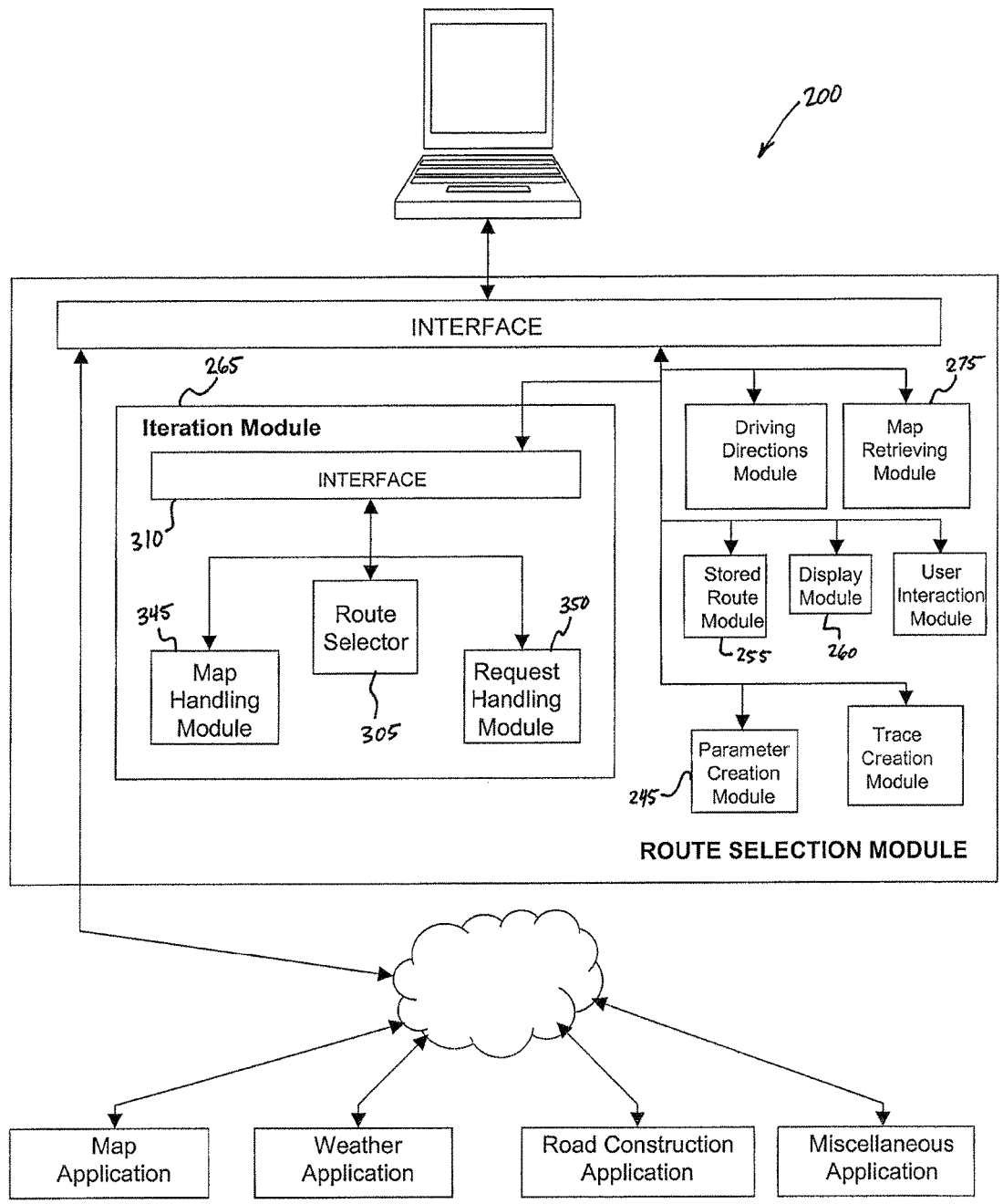
FIG. 6 is a block diagram of the exemplary route selection system of FIG. 2, with one component (an iteration module) shown in greater detail.

FIG. 6 shows the route selection system 200 of FIG. 2 with the iteration module 265 shown in greater detail. As discussed above, the iteration module 265 may receive a map from the map retrieving module 275. The iteration module 265 may receive the map at a map handling module 345 via an interface 310. The iteration module 265 may receive a request for information related to the map's legend from the parameter creation module 245 at a request handling module 350 via the interface 310. The request handling module 350 may retrieve responsive information from the map in the map handling module 345. The request handling module 350 may transmit responsive information related to the map's legend to the parameter creation module 245 via the interface 310.

Referring again to FIG. 4, the parameter creation module 245 may be operable to retrieve information related to the map's legend, to perform various calculations based on user-entered parameters, and to provide criteria to the iteration module 265 to allow the iteration module 265 to select one or more routes. The parameter creation module 245 may receive information related to the map's legend from the iteration module 265 at the legend retriever 290 via the interface 280. The legend retriever 290 may provide the information related to the map's legend to the processor 285. The processor 285 may instruct an equation retriever 295 to retrieve a suitable equation from an equation repository 300. For example, if the parameters include 45-minute duration and 7-minute miles, the processor 285 may instruct the equation retriever 295 to select the following equation from the equation repository 300: Real-life distance is equal to time duration divided by rate of speed. Using the information related to the map's legend and the equation retrieved from the equation repository 300, the processor 285 may calculate a rough line length. Using the parameters provided in the example above and the corresponding equation, along with legend-related information of, e.g., one inch equals 0.5 mile, the processor 285 would calculate a rough line length of approximately 12.9 inches. The parameter creation module 245 may provide the rough line length to the iteration module 265. The parameter creation module 245 may provide additional parameters to the iteration module 265 that may enable the iteration module 265 to focus on a portion of the selected map. Such map focusing criteria may include starting location, ending location, a landmark to be encountered at a particular point (e.g., a water break five miles into the travel), a desired travel surface, and/or other map focusing criteria. In the event that certain parameters are entered (e.g., a desired amount of elevation change), the parameter creation module 245 may provide elevation change criteria to the iteration module 265. In the event that certain parameters are entered (e.g., a desired amount of calories to be burned), the parameter creation module may provide calorie criteria to the iteration module 265. The calorie criteria may be a function of the route's distance, the person's weight, and the route's elevation change. In some embodiments, the calorie criteria may be a function of the weather (e.g, a traveler may tend to burn more calories on a hot, humid day than on a cool, breezy day). The information provided by the parameter creation module 245 to the iteration module 265 may allow the iteration module 265 to select one or more routes.

Referring again to FIG. 6, the iteration module 265 may assist the parameter creation module 245 in generating a route corresponding to parameters provided by a user. The iteration module 265 may receive the rough line length, the map focusing criteria, the elevation change criteria, and/or the calorie criteria from the parameter creation module 245 at a route selector 305 via the interface 310. The route selector 305 may be capable of selecting a list of potential routes. The route selector 305 may submit a request to the map handling module 345 for a list of routes based on the rough line length, the map focusing criteria, the elevation change criteria, and/or the calorie criteria. The map handling module 345 may select all routes on the map that have a length approximately equal to the rough line length, that satisfy map focusing criteria, that satisfy the elevation change criteria, and/or that satisfy the calorie criteria. The map handling module 345 may provide the route selector 305 with a list of potential routes along with verification information related to the rough line length and/or the criteria provided by the parameter creation module 245. If the map handling module 345 is unable to find any such routes, the map handling module 345 may so notify the route selector 305. The route selector 305 may provide either a notification that no routes were found or the list of potential routes and corresponding verification information to the parameter creation module 245 via the interface 310.

Referring again to FIG. 4, the parameter creation module 245 may be responsible for verifying that the routes selected by the iteration module 265 do indeed meet all of the user parameters. The parameter creation module 245 may receive the list of potential routes and corresponding verification information from the iteration module 265 at the processor 285 via the interface 280. The processor 285 may determine which of the potential routes satisfy all the parameters entered by the user. The processor 285 may provide the iteration module 265, via the interface 280, with a list of verified routes and may instruct the iteration module 265 to provide the map and the routes to the display module 260 for display. The processor 285 may instruct the iteration module 265 to provide the map and the routes to the stored route module 255 for storage.

The parameter creation module 245 shown in FIG. 4 includes multiple components. Modules designed to generate one or more routes based on parameters provided by a user may include a greater or lesser number of components. In parameter creation module embodiments, the functions performed by multiple components in the parameter creation module 245 discussed herein may be combined into fewer components, such as one component. For example, the multiple functions performed by the equation retriever 295 and the legend retriever 290 discussed herein may be performed by a single retriever component. In some parameter creation module embodiments, the functions performed by one component in the parameter creation module 245 discussed herein may be performed by multiple components. For example, the multiple functions of the processor 285 discussed herein may be performed by, e.g., an external communication component, an internal communication component, a calculation component, a verification component, and/or other miscellaneous components. Some parameter creation module embodiments may include additional components to provide additional functionality. For example, one or more components may be provided that are dedicated to handling and analyzing maps, or performing the functions of the iteration module 265 as discussed herein. Components of parameter creation modules may perform the functions discussed herein in various ways. The ways by which the components of the parameter creation module 245 are discussed herein are provided only for illustration.

Referring again to FIG. 6, the iteration module 265 may receive a list of verified routes and may provide those verified routes to components per instructions received from the parameter creation module 245. The iteration module 265 may receive the list of verified routes and the instructions to provide the verified routes at the route selector 305 and the instructions to provide the map at the map handling module 345 via the interface 310. The route selector 305 may provide the verified routes to the display module 260 for display and to the stored route module 255 for storage. The map handling module 345 may provide the map to the display module 260 for display and to the stored route module 255 for storage.

The iteration module 265 shown in FIG. 6 includes multiple components. Iteration modules 265 may include a greater or lesser number of components. In iteration module embodiments, the functions performed by multiple components in the iteration module 265 discussed herein may be combined into fewer components, such as one component. For example, the multiple functions performed by the map handling module 345 and the route selector 305 discussed herein may be performed by a single component dedicated to handling and analyzing maps. In some iteration module embodiments, the functions performed by one component in the iteration module 265 discussed herein may be performed by multiple components. For example, the multiple functions of the route selector 305 discussed herein may be performed by, e.g., a component for analyzing line length, a component for analyzing map focusing criteria, a component for analyzing elevation change criteria, a component for analyzing calorie criteria, and/or other miscellaneous components. Some iteration module embodiments may include additional components to provide additional functionality. For example, a component may be provided that is dedicated to receiving parameters from users, performing calculations, and/or performing other functions discussed in connection with the parameter creation module 245 herein. Components of iteration modules may perform the functions discussed herein in various ways. The ways by which the components of the iteration module 265 discussed herein are provided only for illustration.

The exemplary system discussed in connection with FIGS. 4-6 may be implemented with displays similar to those of FIGS. 1B-1C. FIGS. 1B-1C may include a display 135, which may include a map 137, a key 139, and route selection mode icons 141, 143, 145, similar to those of FIG. 1A. In the display 135, the plan route icon 141 may be highlighted to indicate that the user has chosen to select a route by entering one or more parameters. FIG. 1B shows the display 135 before the user has entered any parameters. The display 135 may include a route criteria drop down menu 147. In this exemplary embodiment, the user may select from four different types of route criteria: calories burned, distance, time, and speed. In some embodiments, more or less types of route criteria may be available (e.g., any combination of the noted criteria can be available). The display may include a preferred path drop down menu 149. In this exemplary embodiment, the user may select from three different types of preferred paths: major intersections, back roads, and no roads. The display 135 may include a counter 151 to indicate the distance of one or more selected paths. As shown, the counter 151 displays path distance in miles, but the counter 151 may display path distance in any suitable unit of measurement (kilometers, meters, feet, yards, etc.). Because FIG. 1B shows the display 135 before the user has entered any parameters, the counter 151 may display a distance of 0.0 miles.

FIG. 1C shows the display 135 after the user has entered parameters. From the route criteria drop down menu 147, the user has selected distance and has indicated a distance of 3.0 miles. From the preferred path drop down menu 149, the user has selected major intersections. In some instances, the user may select from either the route criteria drop down menu 147 or the preferred path drop down menu 149. Based on these criteria, a system similar to that discussed in connection with FIGS. 4-6 may display a route 153. The route 153 may include a start icon 155, a stop icon 157, mile markers 159, and direction indicators 161. The counter 151 may display that the route 153 has a distance of 3.0 miles. In some embodiments, a counter may display that the user would burn a certain number of calories while traveling the route. As discussed elsewhere herein, the user may manipulate the displayed route 153 in various ways. The counter 151 may display the distance of the route 153 in real time during such manipulations (i.e., the distance displayed changes as the route changes). The user may memorize the route 153 and then go travel it (e.g., by running). In some embodiments, the user may print the route 153 and bring it while traveling. In some embodiments, the user may download the route 153 to, e.g., an mp3 player or another portable device for review while traveling. In some embodiments, when the user zooms in or out on the map, the route 153 may zoom in and out with the map, thereby allowing the user to view the route 153 in various degrees of detail. In some embodiments, the display 135 may provide textual instructions corresponding to the route 153, allowing users to travel the route 153 by referring to the displayed map and/or to the textual instructions.

Figure 7:
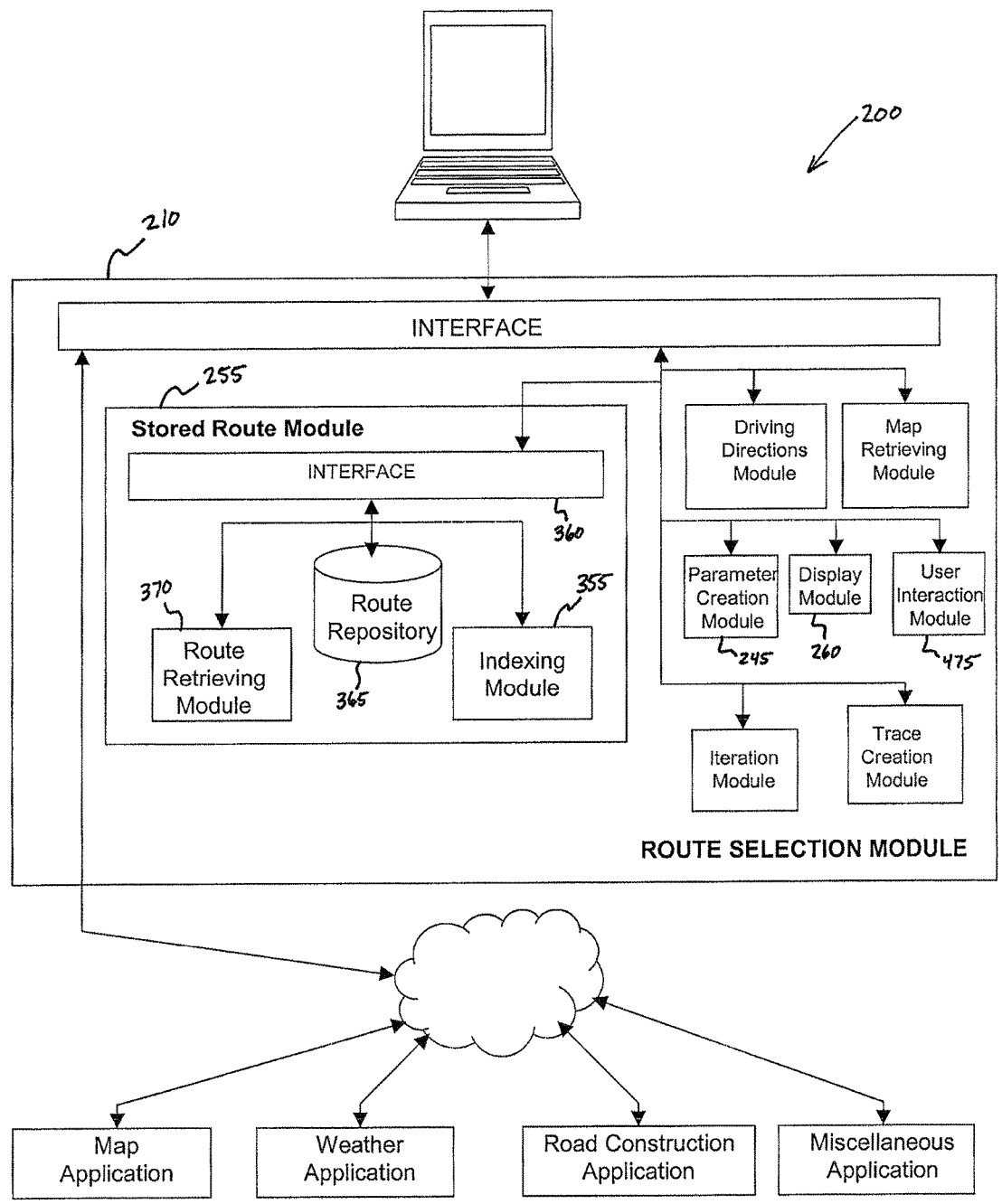
FIG. 7 is a block diagram of the exemplary route selection system of FIG. 2, with one component (a stored route module) shown in greater detail.

FIG. 7 shows the route selection system 200 of FIG. 2 with the stored route module 255 shown in greater detail. The stored route module 255 may include multiple components to store newly created routes in the memory of the route selection module 210 and to provide a route that has been stored in response to user requests. The stored route module 255 may receive maps and routes corresponding to newly created routes at an indexing module 355 via an interface 360. The indexing module 355 may store the newly created routes in a route repository 365 according to criteria such as, e.g., date, length, starting location, weather conditions, time of day, etc. The routes stored in the route repository 365 may be available to be retrieved by users for subsequent use.

In some embodiments, the route selection system 210 may attempt to retrieve a route from the stored route module 255 before creating a route via the parameter creation module 245. The stored route module 255 may receive parameters from the user interaction module 475 at a route retrieving module 370 via the interface 360. The route retrieving module 370 may retrieve routes from the route repository 365 that satisfy all the parameters entered by the user. The route retrieving module 370 may provide the routes (including corresponding maps) to the display module 260 for display. In embodiments in which the route selection system 200 attempts to retrieve a route from the stored route module 255 before creating a route via the parameter creation module 245, the stored route module 255 may notify the parameter creation module 245 whether any routes were retrieved from storage that satisfy all the parameters entered by the user. If no routes were retrieved from storage, the parameter creation module 245 may proceed to generate one or more routes (as discussed above). If one or more routes were retrieved from storage, the route selection module 210 may prevent the parameter creation module 245 from generating routes.

The stored route module 255 shown in FIG. 7 includes multiple components. Stored route module embodiments may include a greater or lesser number of components. In stored route module embodiments, the functions performed by multiple components in the stored route module 255 discussed herein may be combined into fewer components, such as one component. For example, the multiple functions performed by the route retrieving module 370 and the indexing module 355 discussed herein may be performed by a single component that is capable of both storing and retrieving routes. In some stored route module embodiments, the functions performed by one component in the stored route module 255 discussed herein may be performed by multiple components. For example, the multiple functions of the route retrieving module 370 discussed herein may be performed by, e.g., a component dedicated to receiving parameters, a component dedicated to searching storage, and other miscellaneous components. Some stored route module embodiments may include additional components to provide additional functionality. For example, components may be provided that allow for searching other computers in a network for stored routes. Components of stored route modules may perform the functions discussed herein in various ways. The ways by which the components of the stored route module 255 discussed herein are provided only for illustration.

Figure 1D:
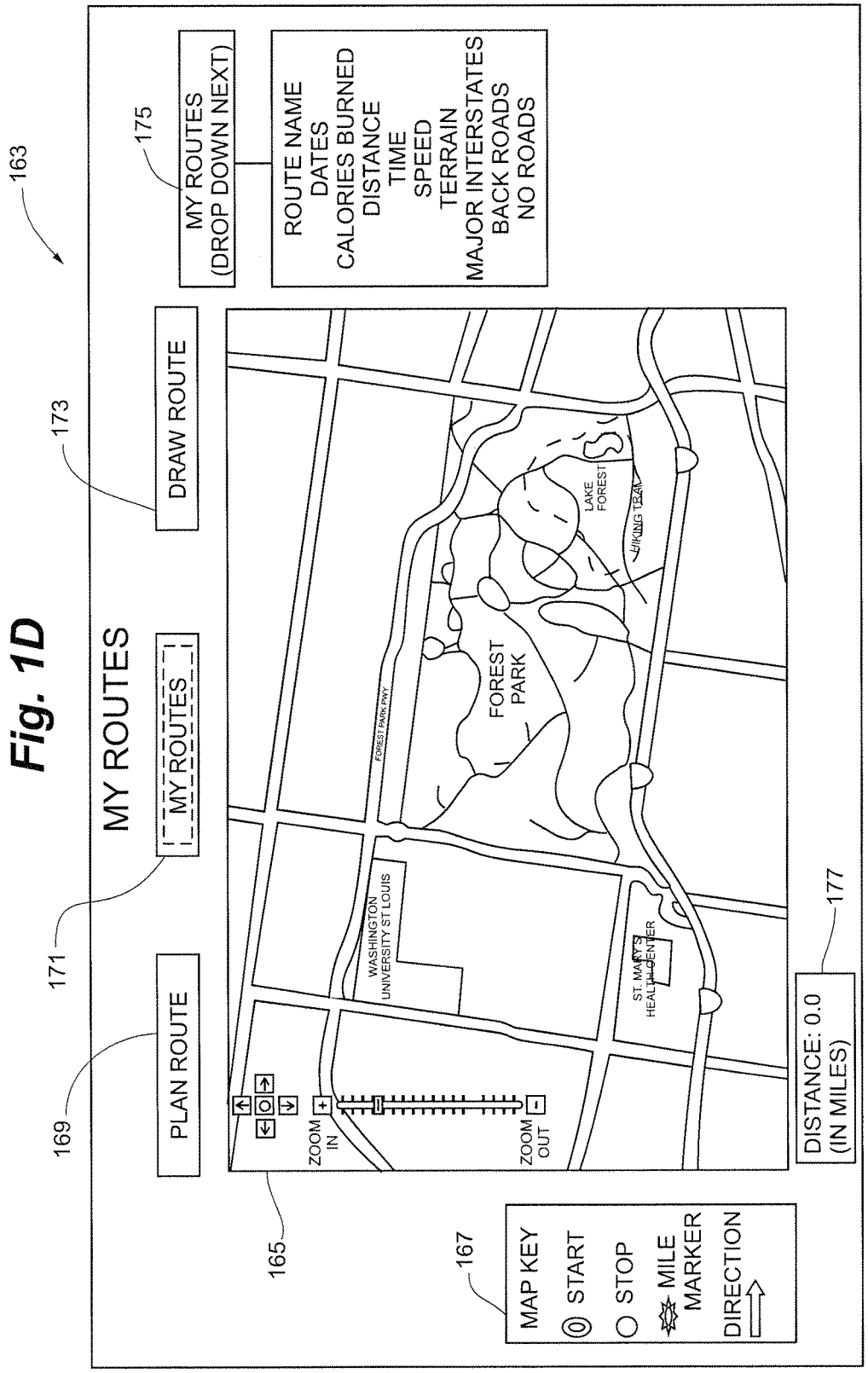
FIG. 1D shows an exemplary display.
Figure 1E:
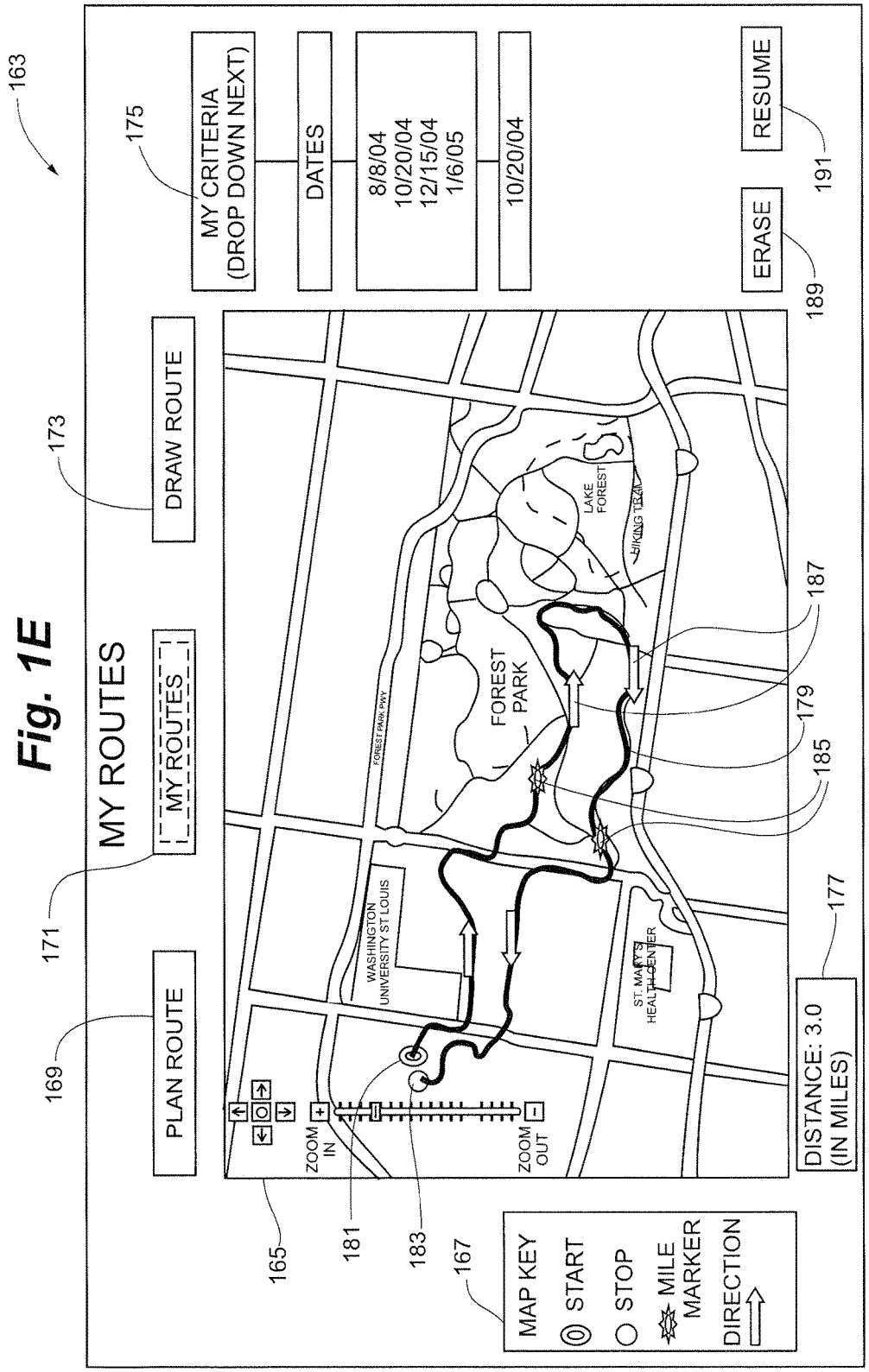
FIG. 1E shows an exemplary display.

The exemplary system discussed in connection with FIG. 7 may be implemented with displays similar to those of FIGS. 1D-1E. FIGS. 1D-1E may include a display 163, which may include a map 165, a key 167, and route selection mode icons 169, 171, 173, similar to those of FIG. 1A. In the display 163, the my route icon 171 may be highlighted to indicate that the user has chosen to select a previously stored route. FIG. 1D shows the display 163 before the user has selected a previously stored route. The display 163 may include a my routes drop down menu 175. In this exemplary embodiment, the user may select previously stored routes ten different ways: by route name, by date, by calories burned, by distance, by time, by speed, by terrain, by major interstates, by lighted paths, by back roads, and by no roads. In other embodiments, users may select previously stored routes in a greater or lesser number of ways (e.g. any subgroup of the 10 noted ways may be available). The display 135 may include a counter 177 to indicate the distance of one or more previously stored routes. The display 135 may include a counter to indicate the number of calories burned for one or more of the previously stored routes and/or a counter to indicate the pace at which the user completed the one or more previously stored routes. As shown, the counter 177 displays path distance in miles, but the counter 177 may display path distance in any suitable unit of measurement. Because FIG. 1D shows the display 163 before the user has entered any parameters, the counter 177 may display a distance of 0.0 miles.

FIG. 1E shows the display 163 after the user has selected a previously stored route. From the my routes drop down menu 175, the user has selected a route dated Oct. 20, 2004. The date may correspond to the date the route was first created, last modified, or other significant date. Per the user's selection, a system similar to that discussed in connection with FIG. 7 may display a route 179. The route 179 may include a start icon 181, a stop icon 183, mile markers 185, and direction indicators 187. The counter 177 may display that the route 179 has a distance of 3.0 miles. The user may memorize the route 179 and then go travel it (e.g., by running). In some embodiments, the user may print the route 179 and bring it while traveling. In some embodiments, the user may download the route 179 to, e.g., an mp3 player or another portable device for review while traveling.

In some embodiments, when the user zooms in or out on the map, the route 153 may zoom in and out with the map, thereby allowing the user to view the route 153 in various degrees of detail. In some embodiments, the display 135 may provide textual instructions corresponding to the route 153, allowing users to travel the route 153 by referring to the displayed map and/or to the textual instructions.

In some embodiments, a user may wish to modify a previously stored route. The display 163 of FIG. 1E may include an erase icon 189 and a resume icon 191. The user may modify the route 179 by actuating the erase icon 189. The user may then provide input (e.g., by entering parameters or by tracing) indicating which portion(s) of the route 179 should be erased. The user may then actuate the resume icon 191 to further edit the route 179 by, e.g., drawing a new path to connect segments of the route that were affected by the erasure. In some instances, the user may actuate the resume icon 191 to finalize the route 179 for memorization, for printing, or for download. An example of the functionality associated with modifying a displayed route is discussed in greater detail in connection with FIGS. 1G-1H, and 3. An exemplary system equipped with editing functionality is discussed in connection with FIG. 3.

Figure 8:
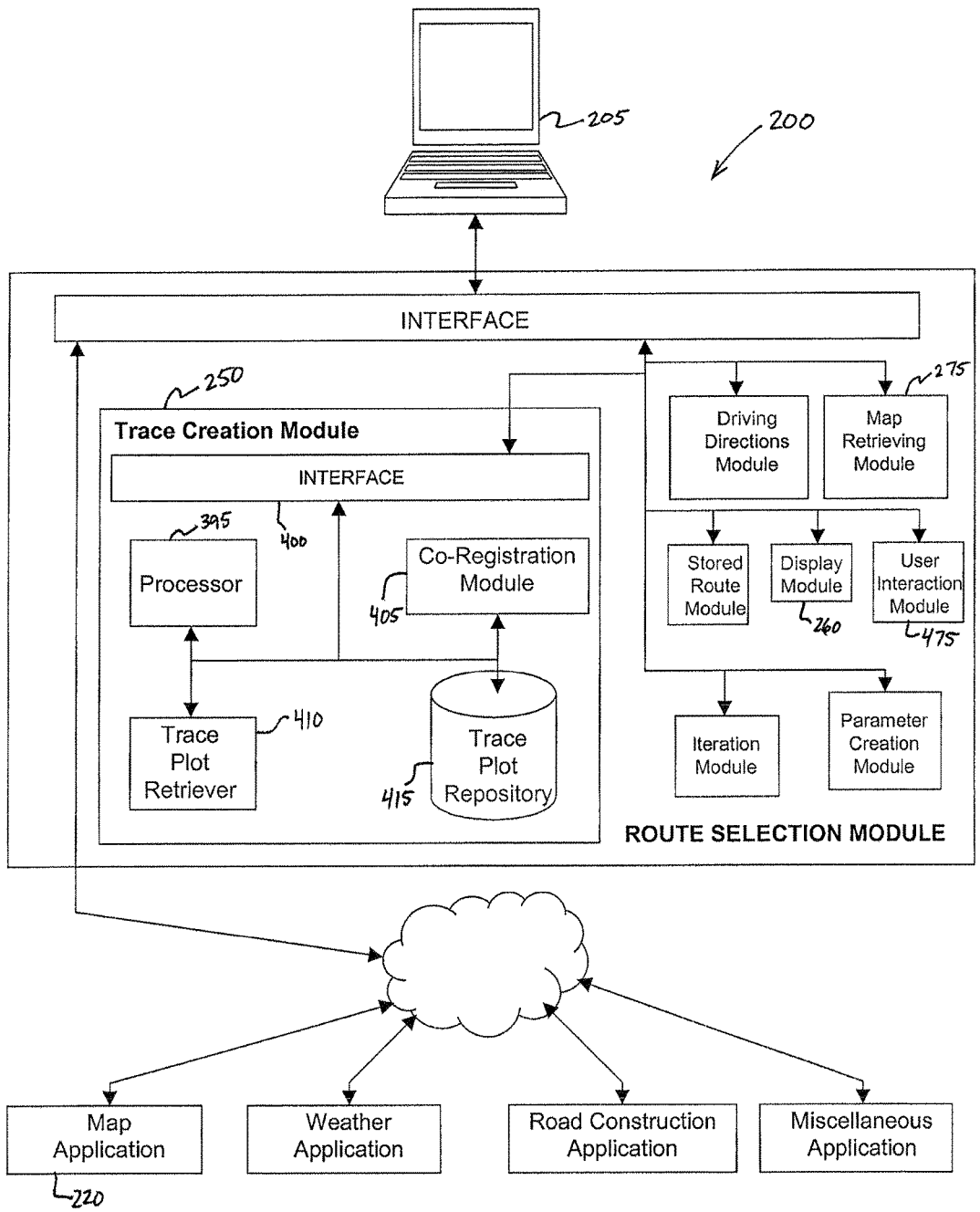
FIG. 8 is a block diagram of the exemplary route selection system of FIG. 2, with one component (a trace creation module) shown in greater detail.

FIG. 8 shows the route selection system 200 of FIG. 2 with the trace creation module 250 shown in greater detail. The trace creation module 250 may include multiple components to allow a user to generate a route by providing input through tracing, for example, a stylet or a mouse on a screen of the computer 205. The trace creation module 250 may receive parameters from the user interaction module 475 at a processor 395 through an interface 400. The parameters may be similar to those discussed in connection with FIG. 4. Referring again to FIG. 8, the parameters may include an indication that the user wishes to generate a route via tracing. In such instances, the processor 395 may determine whether the parameters entered provide enough information to enable the map retrieving module 275 to retrieve a map from the map application 220. If the processor 395 determines that the parameters entered do not provide enough information to enable the map retrieving module 275 to retrieve a map, the processor 395 may cause a notification to be displayed to the user, requesting additional information. For example, if the parameters included only distance, the processor 395 may cause a notification to be displayed to the user, requesting information such as starting location or ending location. If the processor 395 determines that the parameters entered provide enough information to enable the map retrieving module 275 to retrieve a map, the processor 395 may provide such parameters to the map retrieving module 275 via the interface 400. The map retrieving module 275 may then retrieve a suitable map from, e.g., the map application 220 in a manner similar to that discussed in connection with FIG. 5. The trace creation module 250 may receive the map from the map application 220 at a co-registration module 405 via the interface.

The co-registration module 405 of the trace creation module 250 may be designed to provide a traceable map to the display module 260 to allow users to generate a route via tracing. As discussed above, the processor 395 may receive parameters that include an indication that the user wishes to generate a route via tracing. The processor 395 may instruct a trace plot retriever 410 to retrieve a trace plot from a trace plot repository 415. A trace plot may be a plot that registers multiple points according to X-Y coordinates in response to tracing activity by a user. The trace plot retriever 410 may retrieve a trace plot from the trace plot repository 415 and may provide the trace plot to the co-registration module 405.

The co-registration module 405 may co-register the map received from the map application 220 via the interface 400 and the trace plot received from the trace plot retriever 410, overlaying the trace plot on top of the map to create a traceable map. The co-registration module 405 may provide the traceable map to the display module 260, via the interface 400, for display to allow the user to generate a route via tracing.

The trace creation module 250 shown in FIG. 8 includes multiple components. Modules designed to allow a user to generate a route by providing input through tracing, for example, a stylet or a mouse on a screen of the computer 205 may include a greater or lesser number of components. In trace creation module embodiments, the functions performed by multiple components in the trace creation module 250 discussed herein may be combined into fewer components, such as one component. For example, the multiple functions performed by the trace plot retriever 410 and the co-registration module discussed herein may be performed by a single component dedicated to retrieving traceable maps. In some trace creation module embodiments, the functions performed by one component in the trace creation module 255 discussed herein may be performed by multiple components. For example, the multiple functions of the co-registration module 405 discussed herein may be performed by, e.g., a component dedicated to creating traceable maps, a component dedicated to handling and responding to internal communications, and/or other miscellaneous components. Some trace creation module embodiments may include additional components to provide additional functionality. For example, components may be provided that allow the trace creation module to interact directly with users in receive input and provide real-time feedback. Components of trace creation modules may perform the functions discussed herein in various ways. The ways by which the components of the trace creation module 250 discussed herein are provided only for illustration.

Figure 9:
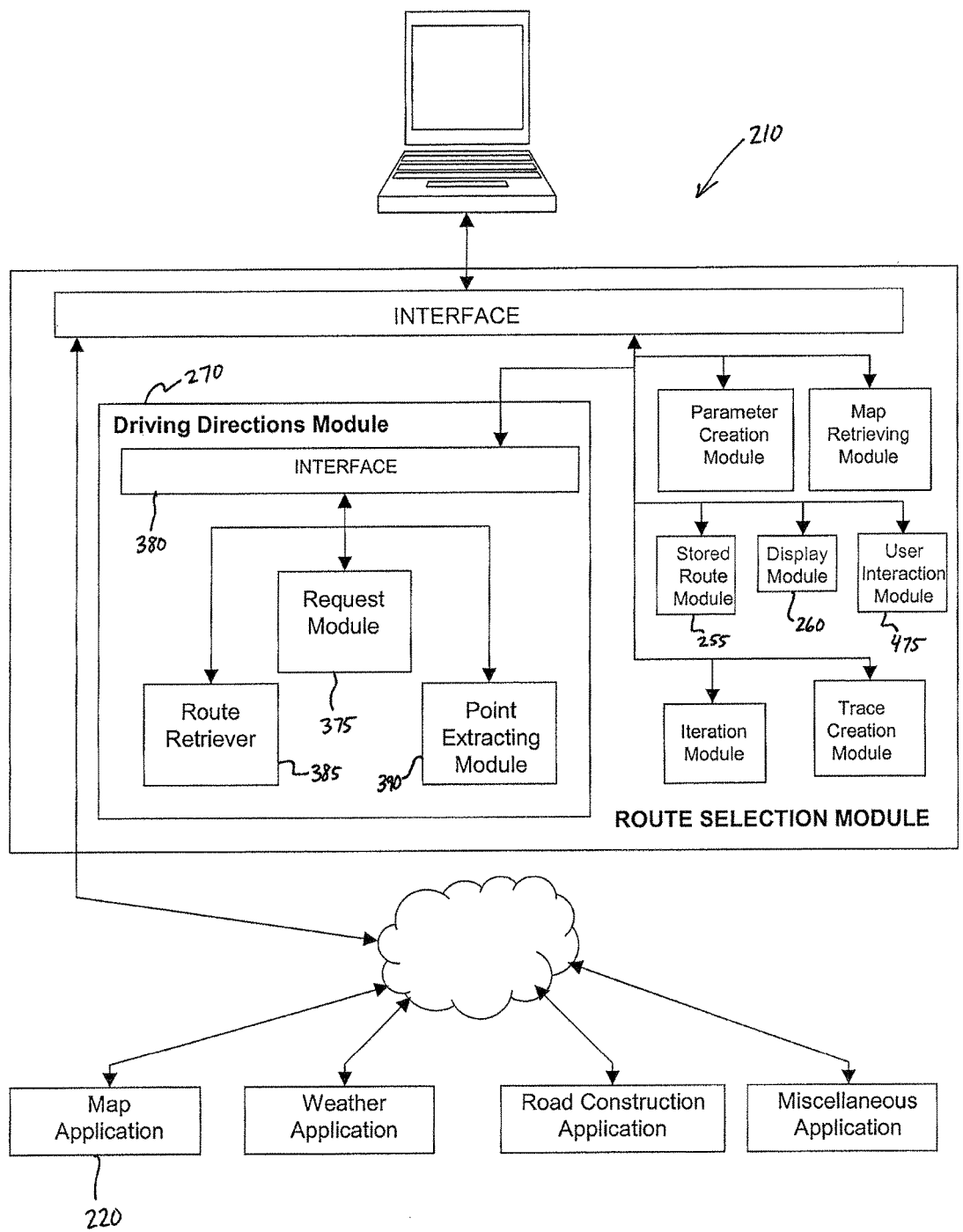
FIG. 9 is a block diagram of the exemplary route selection system of FIG. 2, with one component (a driving directions module) shown in greater detail.

FIG. 9 shows the route selection system 200 of FIG. 2 with the driving directions module 270 shown in greater detail. The driving directions module 270 may include multiple components to provide driving directions corresponding to the selected route. Under some circumstances, a user may wish to obtain driving directions that correspond to one or more routes. For example, a user may have enjoyed a route that he or she previously jogged, hiked, biked, etc., and may wish to drive as closely as possible along that route. Other examples involve driving to the starting location of a route to drop someone off and/or driving to the ending location of a route to pick someone up. The driving directions module 270 may receive a request from the user interaction module 475 to provide driving directions that correspond to one or more routes at a request module 375 via an interface 380. In some situations, the request may include location information, such as the location from which the user wishes to drive, along with information concerning the route, such as the ending location. In some situations, the request may include only information concerning the route (e.g., the starting location, the ending location, and/or one or more intermediate locations). The request module 375 may instruct a route retriever 385 to retrieve a route from, e.g., the display module 260 or the stored route module 255, that corresponds to the user's request. The route retriever 385 may receive the route (including the corresponding map) in response and may provide the route to the request module 375. The request module 375 may assess what information is needed to formulate a request to an external application, such as map application 220. The request module 375 may use information provided along with the user request to formulate a driving directions request (e.g., the location from which the user wishes to drive). The request module 375 may instruct a point extracting module 390 to extract information from the route/map combination (e.g., an intermediate location). The request module 375 may formulate a driving directions request based on the extracted information or the combined extracted information and user-provided information. The request module 375 may transmit the driving directions request to an external map application, such as map application 220, via the interface 380. The request module 375 may receive driving directions in response from the external application via the interface 380. The request module 375 may provide the driving directions to the display module 260 for display. In some embodiments, the driving directions module 270 may provide directions for forms of travel other than driving (e.g., hiking, biking, etc.) in a manner similar to that discussed herein. In such embodiments, the user may be able to obtain directions even if the desired destination is unreachable by driving on streets/highways/roads.

The driving directions module 270 shown in FIG. 9 includes multiple components. Modules designed to provide driving directions corresponding to the selected route may include a greater or lesser number of components. In driving directions module embodiments, the functions performed by multiple components in the driving directions module 270 discussed herein may be combined into fewer components, such as one component. For example, the multiple functions performed by the route retriever 385 and the point extracting module 390 discussed herein may be performed by a single component designed to extract information from routes. In some driving directions module embodiments, the functions performed by one component in the driving directions module 270 discussed herein may be performed by multiple components. For example, the multiple functions of the request module 375 discussed herein may be performed by, e.g., a component dedicated to handling and responding to internal requests, a component dedicated to communicating requests to external map applications, and other miscellaneous components. Some driving directions module embodiments may include additional components to provide additional functionality. For example, a component may be provided that is dedicated to selecting from among multiple sets of driving directions received from external map applications based on user preferences. Components of driving directions modules may perform the functions discussed herein in various ways. The ways by which the components of the driving directions module 270 discussed herein are provided only for illustration.

Figure 10:
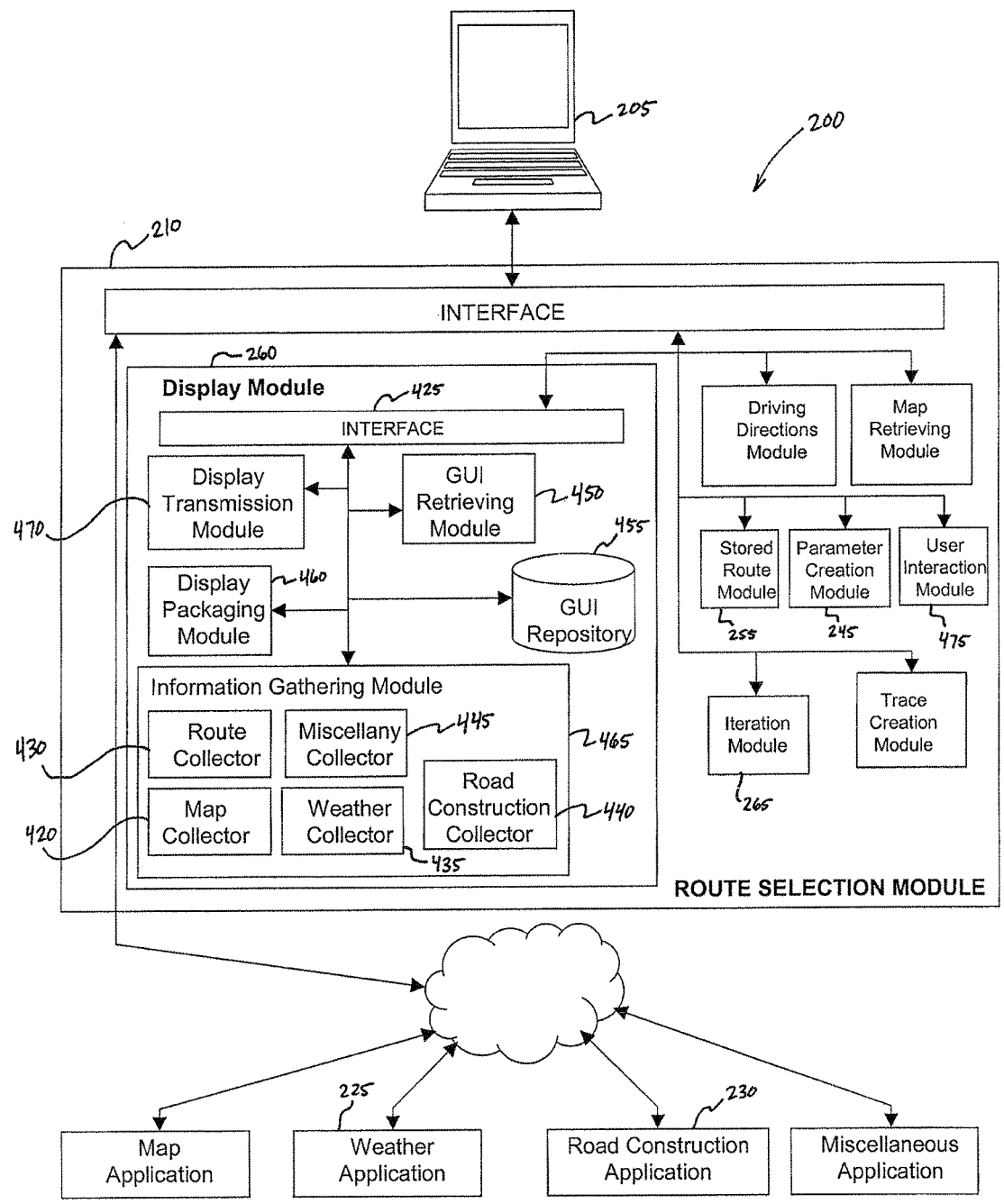
FIG. 10 is a block diagram of the exemplary route selection system of FIG. 2, with one component (a display module) shown in greater detail.

FIG. 10 shows the route selection system 200 of FIG. 2 with the display module 260 shown in greater detail. The display module 260 may include multiple components to collect various information from the components of the route selection module 210 and generate a display to be transmitted to and displayed on the computer 205.

The display module 260 may include an information gathering module 465, which may collect information from one or more components of the route selection module 210, depending on the user's request and/or on other factors. For example, the information gathering module 465 may receive a suitable map from the iteration module 265, as discussed in connection with FIG. 6, at a map collector 420 via an interface 425. The information gathering module 465 may receive weather information from an external application such as the weather application 225 at a weather collector 435 via the interface 425. The information gathering module 465 may receive road construction information from an external application such as the road construction application 230 at a road construction collector 440 via the interface 425. The information gathering module 465 may receive other miscellaneous information from various applications at a miscellany collector 445 via the interface 425. Examples of such miscellaneous information include information related to training logs, dietary logs, and the like.

The information gathering module 465 may receive various routes from one or more components of the route selection module 210 at a route collector 430 via the interface 425, depending on the user's request and/or on other factors. For example, the route collector 430 may collect verified routes from the iteration module 265 and/or the parameter creation module 245 via the interface 425, as discussed in connection with FIGS. 4 and 6. The route collector 430 may collect stored routes from the stored route module 255, as discussed in connection with FIG. 7. In some embodiments, the route collector 430 may collect routes from multiple sources.

With information collected from one or more components of the route selection module 210, the display module 260 may generate a display to be displayed on the computer 205. The display module 260 may include a GUI retrieving module 450, which may retrieve a graphical user interface from a GUI repository 455 that corresponds to parameters entered by the user. The display module 260 may include a display packaging module 460, which may retrieve the graphical user interface from the GUI retrieving module 450, the user-entered request from the user interaction module 475, the information from the information gathering module 465, and/or other information. The display packaging module 460 may create a display. In the display, one or more routes may be displayed. If a route involves covering the same path more than once, that path may be displayed in such a way as to indicate the multiple passes (e.g., by displaying the path in a different color than the rest of the route and/or by providing textual indication). The display packaging module 460 may provide the display to a display transmission module 470, which may provide the display to the user interaction module 475.

The display module 260 shown in FIG. 10 includes multiple components. Modules designed to collect various information from components of the route selection module 210 and generate a display to be transmitted to and displayed on the computer 205 may include a greater or lesser number of components. In display module embodiments, the functions performed by multiple components in the display module 260 discussed herein may be combined into fewer components, such as one component. For example, the multiple functions performed by the weather collector 435, the road construction collector 440, and the miscellany collector 445 may be performed by a single component designed to collect information from external applications. In some display module embodiments, the functions performed by one component in the display module 260 discussed herein may be performed by multiple components. For example, the multiple functions of the route collector 430 discussed herein may be performed by, e.g., a component dedicated to collecting verified routes, a component dedicated to collecting traceable maps, a component dedicated to collecting stored routes, and/or other miscellaneous components. Some display module embodiments may include additional components to provide additional functionality. For example, a component may be provided that is dedicated to interfacing directly with users. Components of display modules may perform the functions discussed herein in various ways. The ways by which the components of the display module 260 discussed herein are provided only for illustration.

Referring again to FIG. 3, the user interaction module 475 may provide responsive information to users at the computer 205 via the interface 480. The user interaction module 475 may receive a display from the display module 260 at a display handling module 490 via the interface 480. The display handling module 490 may verify that the display is indeed responsive to the request provided by the user. The display handling module 490 may provide the display to the computer 205 via the interface to be displayed for the user.

In some instances, the user interaction module 475 may provide additional assistance to the user in selecting a route. For instance, in the event the user request involves tracing a route, the user interaction module 475 may provide a traceable map to the computer 205 via the interface 480 for display to the user The user may enter additional information, such as by tracing a route on the traceable map with a stylet, a mouse, or other suitable tracing instrument. Such information may be provided to the user interaction module 475 at a follow-up module 495 via the interface 480. The follow-up module 495 may process that information, modify the display, and provide a modified display to the computer 205 for display to the user. For example, the follow-up module 495 may include the traced route on the display and may calculate the distance and/or other characteristics of the traced route. In some embodiments, the follow-up module 495 may provide a display that includes the traced route and the distance and/or other characteristics of the traced route in real time (i.e., as the user traces). In some embodiments, the follow-up module 495 may provide a modified display that is based solely on the user's tracing. In such embodiments, the modified display may display the traced route exactly as the user traced it. In some embodiments, the follow-up module 495 may provide a modified display that is based in part on the user's tracing and in part on other factors. In such embodiments, the user may trace a route with a suitable tracing instrument and may also indicate that the displayed route should be, e.g., entirely on well-lighted sidewalks such that no point on the route strays more than 0.5 miles from the traced route. In such embodiments, the follow-up module 495 may determine whether any routes satisfy the user-entered criteria and may modify the display to provide the responsive route if possible. In such embodiments, the user may indicate the distance that the calculated route may stray from the traced route by tracing with a thicker line to indicate a greater stray distance and tracing with a thinner line to indicate a lesser stray distance. In some embodiments in which the follow-up module 495 provides a modified display that is based in part on the user's tracing and in past on other factors, the other factors may include user-entered parameters. In such embodiments, the user could enter a starting location and an ending location and then trace the route in between. In such embodiments the user could enter a starting location and trace the route, leaving the last point traced as the ending location. In such embodiments, the user could enter starting and ending locations via tracing and then enter parameters to define a route between the starting and ending locations.

Other examples of the functionality of the follow-up module 495 may involve a user wishing to erase a portion of a route displayed. In such instances, the user may provide an indication to the computer 205 that he/she wishes to erase a portion of a displayed route. The indication may be provided to the follow-up module 495 via the interface 480. The user may provide to the computer 205 information specifying which portion of which route he/she wishes to erase. In some embodiments, the user may provide such specifying information by entering parameters via a keyboard or other language-based input instrument. In some embodiments, the user may provide such specifying information by tracing with a stylet, a mouse, or other suitable tracing instrument. The follow-up module 495 may receive such specifying information. The follow-up module 495 may process the specifying information, modify the display, and provide a modified display to the computer 205 for display to the user. For example, the follow-up module 495 may include the modified route (i.e., the original route minus the erasure) on the display and may calculate the distance and/or other characteristics of the modified route. In some embodiments, the follow-up module 495 may provide a display that includes the modified route and the distance and/or other characteristics of the modified route in real time. In some embodiments, the follow-up module 495 may calculate the distance for two separate routes on the map at the same time.

Other examples of the functionality of the follow-up module 495 may involve a user wishing to view information corresponding to a portion of a route displayed. In such instances; the user may provide an indication to the computer 205 that he/she wishes to view such information. The indication may be provided to the follow-up module 495 via the interface 480. The user may provide information specifying the portion of the route that he/she wishes to know more about to the computer 205. In some embodiments, the user may provide such specifying information by entering parameters via a keyboard or other language-based input instrument. In some embodiments, the user may provide such specifying information by tracing with a stylet, a mouse, or other suitable tracing instrument. The follow-up module 495 may receive such specifying information. The follow-up module 495 may process the specifying information, modify the display (e.g., by highlighting the selected portion), and provide a modified display to the computer 205 for display to the user. In some embodiments, the follow-up module 495 may provide a display that includes the highlighted route and the distance and/or other characteristics of the highlighted route in real time (i.e., while the user is selecting the portion). In some embodiments, the follow-up module 495 may calculate the distance for two separate routes on the map at the same time.

The user interaction module 475 shown in FIG. 3 includes multiple components. Modules designed to perform various functions in interacting with users may include a greater or lesser number of components. In user interaction module embodiments, the functions performed by multiple components in the user interaction module 475 discussed herein may be combined into fewer components, such as one component. For example, the multiple functions performed by the display handling module 490 and the follow-up module 495 may be performed by a single component designed to provide displays to users that correspond to their requests. In some user interaction module embodiments, the functions performed by one component in the user interaction module 475 discussed herein may be performed by multiple components. For example, the multiple functions of the follow-up module 495 discussed herein may be performed by, e.g., a component dedicated to handling erasures, a component dedicated to handling trace-only routes, a component dedicated to handling trace-plus-criteria routes, and/or other miscellaneous components. Some user interaction module embodiments may include additional components to provide additional functionality. For example, a component may be provided that is dedicated to adding advertisements or other miscellaneous information to displays. Components of user interaction modules may perform the functions discussed herein in various ways. The ways by which the components of the user interaction module 475 discussed herein are provided only for illustration.

Figure 1F:
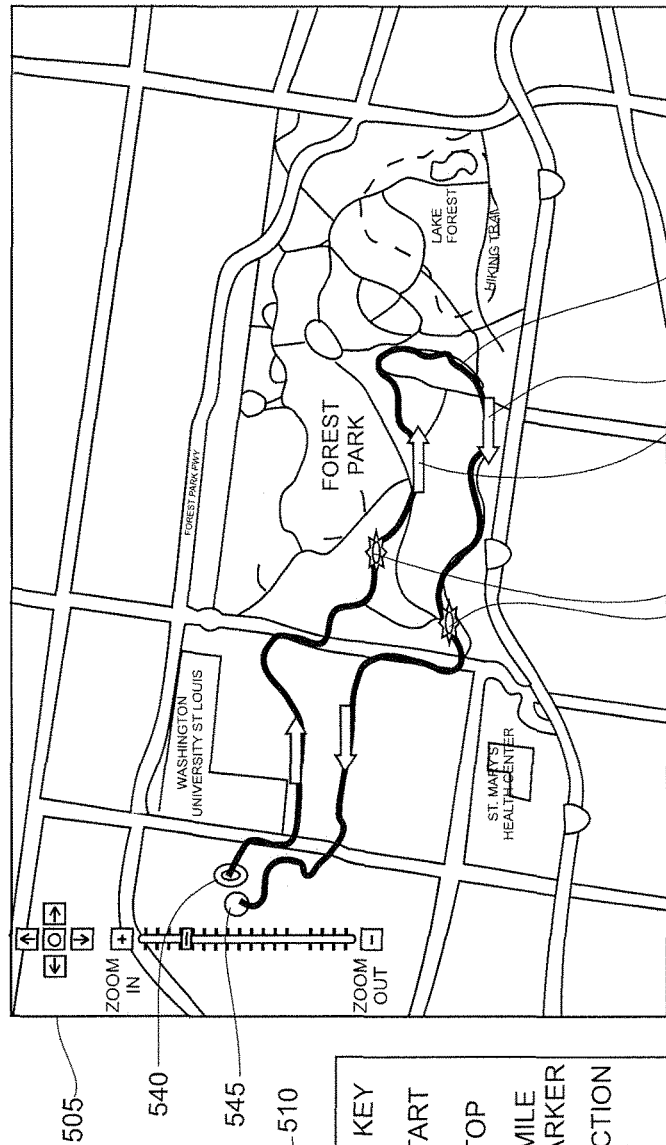
FIG. 1F shows an exemplary display.

The exemplary system discussed in connection with FIGS. 3 and 8 may be implemented with displays similar to those of FIGS. 1F-1H. FIGS. 1F-1H may include a display 500, which may include a map 505, a key 510, and route selection mode icons 515, 520, 525, similar to those of FIG. 1A. In the display 500, the draw route icon 525 may be highlighted to indicate that the user has chosen to select a route by tracing. FIG. 1F shows the display 500, which may include a traced route 530. The display 500 may include a counter 535 to indicate the distance of the traced route 530. As shown, the counter 535 displays path distance in miles, but the counter 535 may display path distance in any suitable unit of measurement. The route 500 may include a start icon 540, a stop icon 545, mile markers 550, and direction indicators 555. The counter 535 may display that the traced route 530 has a distance of .3.0 miles. The counter 535 may display the distance of the traced route 530 as the user traces (i.e., in real time). In some embodiments, the user may select a portion of a displayed route, and the selected portion may be highlighted in the display 500. In such embodiments, multiple portions may be selected, and each portion may be highlighted in a different color. In such embodiments, the display 500 may include multiple counters 535, such as a counter for the entire route along with counters for each selected portion. In some embodiments, multiple routes may be displayed at the same time. In such embodiments, the display 500 may include an aggregate counter that may display the combined distance of all the displayed routes. The user may memorize the traced route 530 and then go travel it (e.g., by running). In some embodiments, the user may print the traced route 530 and bring it while traveling. In some embodiments, the user may download the traced route 530 to, e.g., an mp3 player for review while traveling. In some embodiments, when the user zooms in or out on the map, the route 153 may zoom in and out with the map, thereby allowing the user to view the route 153 in various degrees of detail. In some embodiments, the display 135 may provide textual instructions corresponding to the route 153, allowing users to travel the route 153 by referring to the displayed map and/or to the textual instructions.

In some embodiments, a user may wish to modify a traced route. FIGS. 1G-1H show exemplary displays that may be used in connection with a system having editing functionality. The display 500 of FIGS. 1G-1H may include an erase icon 560 and a resume icon 565. The user may modify the route 530 by actuating the erase icon 560. The user may then provide input (e.g., by entering parameters or by tracing) indicating which portion(s) of the route 530 should be erased. FIG. 1G shows how this may result in a route portion 532 being highlighted in a different color. The distance of the route 530 without the route portion 532 may be reflected in the counter. FIG. 1H shows how the user may then actuate the resume icon 565 to further edit the route 530 by, e.g., drawing a new path to connect segments of the route that were affected by the erasure. This may result in an added portion 534 being displayed, along with a corresponding change in the distance displayed by the counter 535. In some instances, the user may actuate the resume icon 565 to finalize the route 530 for memorization, for printing, or for download (e.g., when the user erases a portion at the beginning or the end of a route 530. An exemplary system equipped with editing functionality is discussed in connection with FIG. 3.

Figure 11:
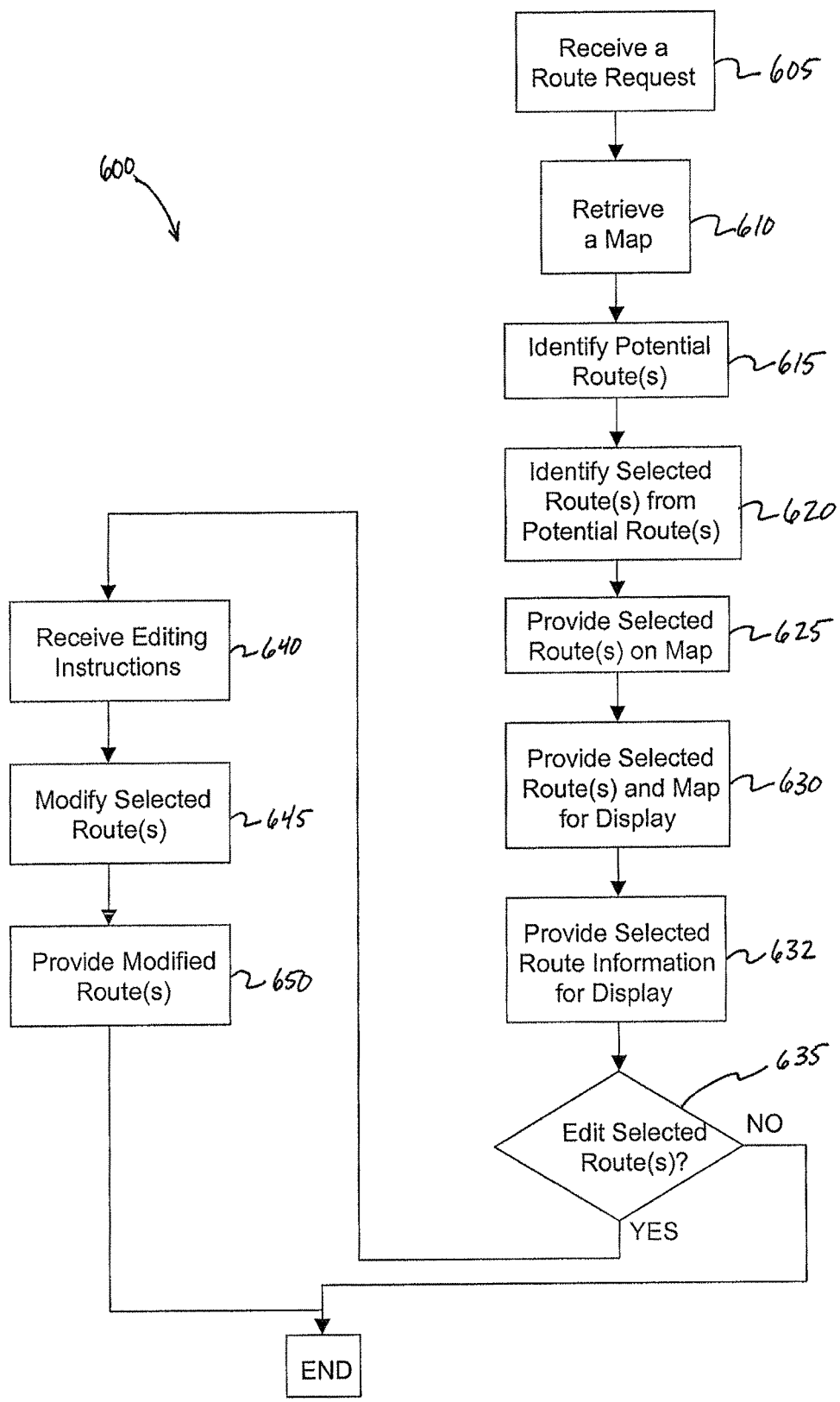
FIG. 11 provides a flow chart for an exemplary method of assisting a user in selecting a route.

FIG. 11 provides a flow chart for an exemplary method (600) of assisting a user in selecting a route. The method (600) may include receiving a route request (605). Receiving a route request (605) may involve receiving any of the various route requests discussed herein or any other suitable route request. The route request may include map information. Such map information may include a starting point, an ending point, a landmark point, or combinations thereof. The route request may include route information. Such route information may include lighting criteria, travel surface criteria, population density criteria, distance criteria, speed criteria, calorie criteria, time criteria, elevation change criteria, landmark criteria, and combinations thereof. The method (600) may include retrieving a map (610). Retrieving a map (610) may be based on the map information. The method (600) may include identifying one or more potential routes (615). Identifying one or more potential routes (615) may be based on a first route information item (e.g., lighting criteria). The method (600) may include identifying one or more selected routes from the potential routes (620). Identifying one or more selected routes from the potential routes (620) may involve identifying which of the one or more potential routes satisfy a second route information item (e.g., travel surface criteria). The method (600) may include providing one or more selected routes on the map (625). Providing one or more selected routes on the map (625) may be based on the route information. The method (600) may include providing one or more selected routes and the map for display to the user (630). The method (600) may include providing selected route information for display to the user (632). Providing selected route information for display to the user (632) may include providing selected route information that corresponds to the one or more selected routes. In some embodiments, the selected route information may include a distance of the one or more selected routes. In some embodiments, the selected route information may include driving directions corresponding to the one or more selected routes. The method (600) may determine whether the user wishes to edit one or more of the selected routes (635). If the user does not wish to edit one or more of the selected routes, the user may use the selected route(s) for travel (e.g., by memorizing, printing, or downloading). If the user wishes to edit one or more selected routes, the method (600) may include receiving editing instructions (640). The editing instructions may be entered by the user. The method (600) may include modifying one or more selected routes (645). Modifying one or more selected routes (645) may be based on the editing instructions. Modifying one or more selected routes (645) may create one or more modified routes. The method (600) may include providing the one or more modified routes for display to the user (650). The method (600) discussed herein is for illustration only. Any of the functionality and/or features discussed herein in connection with a system (see FIGS. 2-10) may also be implemented by a corresponding method and/or corresponding steps. All methods discussed herein may be provided on a computer-readable medium as instructions for causing a programmable processor to act.

Figure 12:
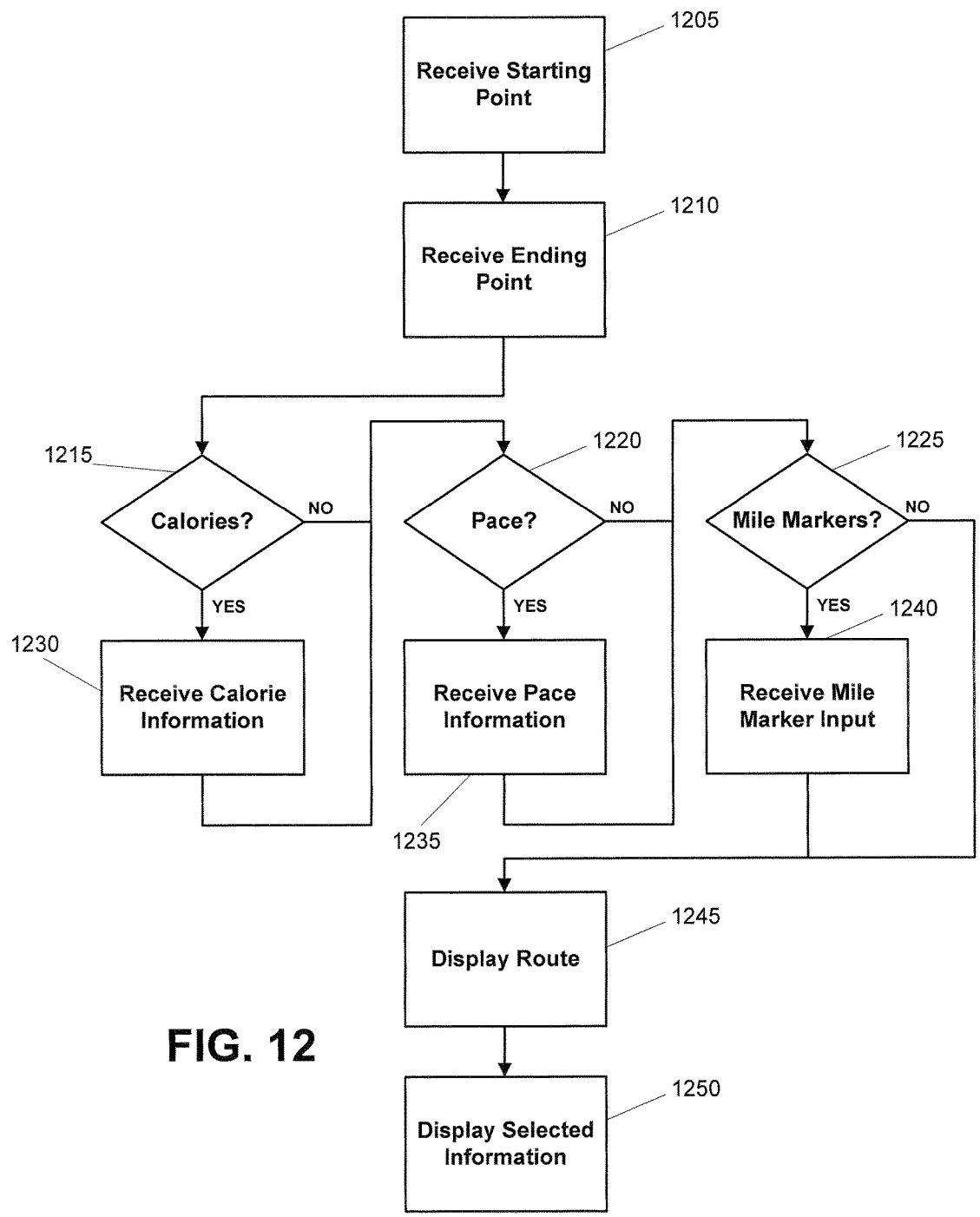
FIG. 12 shows an exemplary method of allowing a runner to determine characteristics of a route.

FIG. 12 shows one example of a method of allowing a runner to determine characteristics of a route that can be used in some embodiments of the present invention. In some embodiments, the method can be performed by a programmable processor, which can act according to instructions programmed in a computer-readable medium. The processor can receive a starting point (1205) and an ending point (1210) corresponding to a route that a runner has run or may run. The processor can receive any additional points that make up a route, and the points can be provided in any of the ways discussed herein.

The processor can ask the runner for additional information, and the runner can provide it, depending on his or her desired output. The runner can have the option of learning how many calories he or she would burn in running the route (1215). If the runner would like to know the number of calories burned, he or she would provide calorie information to the processor (1230). Calorie information could include any of the information concerning calories discussed herein. The runner can have the option of learning the pace at which he or she intended to run the route (1220). If the runner would like to know the pace at which he or she intended to run the route, he or she would provide pace information to the processor (1235). Pace information could include the amount of time the runner expected to take in running the route or any other information concerning pace discussed herein. As is discussed elsewhere herein, the runner can have the option of turning mile markers on or off (1225). If the runner would like to change the mile marker setting (e.g., turning mile markers off or turning mile markers on), he or she could provide one or more mile marker inputs to the processor (1240). Some embodiments can provide runners with options for a greater or lesser number of outputs.

After learning of the runner's desired output and receiving the appropriate information, the processor, can provide the desired output to the runner. In some embodiments, the processor can cause the route (or portion thereof) to be displayed to the user (1245). The processor can do so in any of the ways discussed herein. In some embodiments, the processor can cause the runner's selected information to be displayed to the runner (1250). For example, as is discussed elsewhere herein, the runner can view that he or she would burn X number of calories running the route or would run the route at 8-minute-mile pace, that the base of Z hill is approximately one mile away from home, and so on. The method of FIG. 12 is illustrative. Any of the functionality and/or features discussed herein may be combined with some or all of the functionality and/or features of FIG. 12's method. A runner may use the functionality provided in the method of FIG. 12, or in any of the methods discussed herein, before or after running the route.

Figure 13:
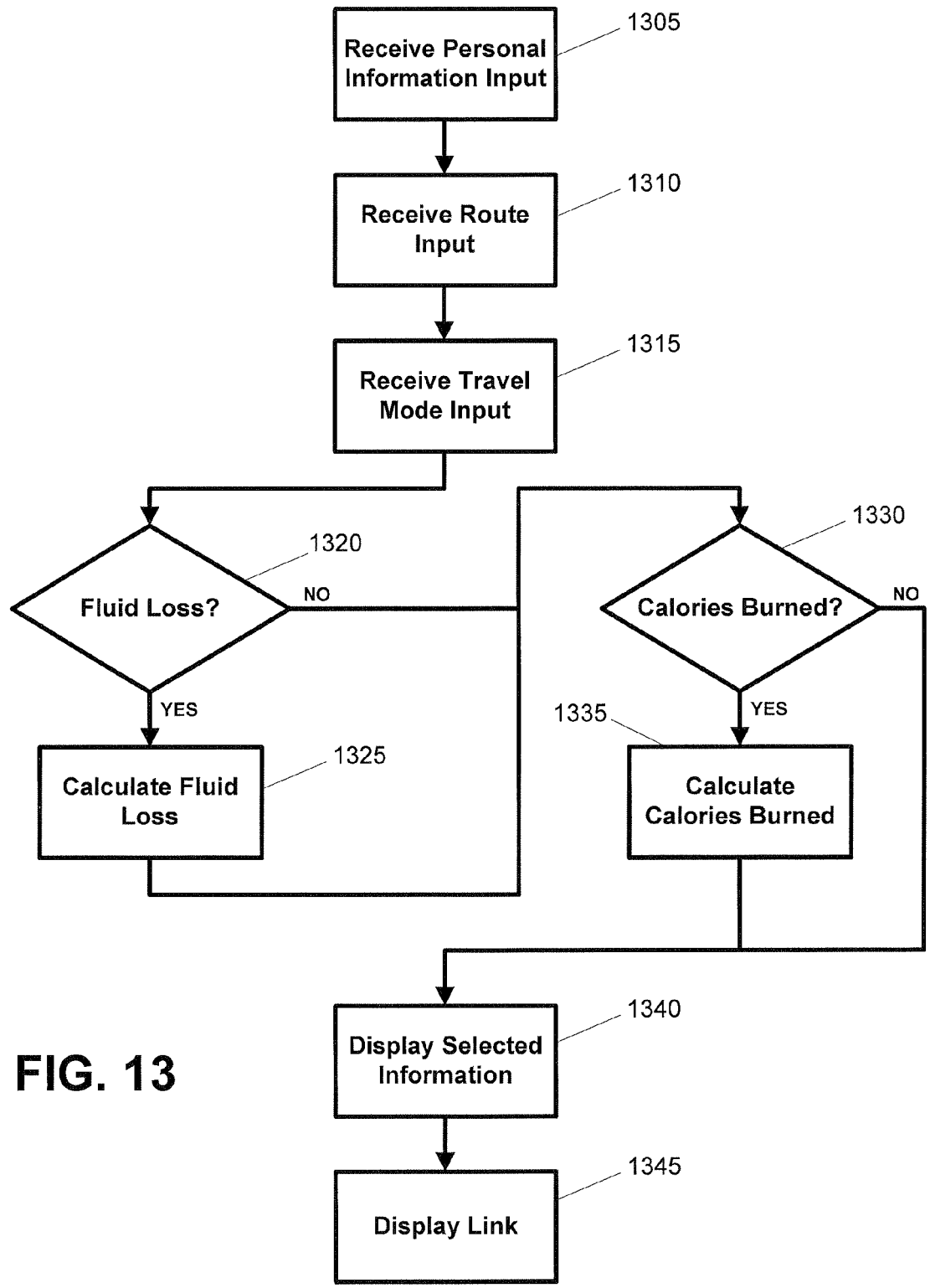
FIG. 13 shows an exemplary method of assisting a traveler in planning a route.

FIG. 13 shows one example of a method of assisting a traveler in planning a route that can be used in some embodiments of the present invention. In some embodiments, the method can be performed by a programmable processor, which can act according to instructions programmed in a computer-readable medium. The processor can receive various kinds of information related to the traveler and the route. For example, the processor can receive a personal information input (1305), a route input (1310), and a travel mode input (1315). The personal information input can include, e.g., the traveler's height, weight, gender, body mass index, body fat percentage, hair color, left handed- or right handed, or other similar information. The route input can include any information associated with the traveler's route (or portion thereof), such as the information discussed elsewhere herein. The travel mode input can include information concerning the mode in which the user traveled the route, including running, walking, biking (with many types of bikes—e.g., mountain bikes, road bikes, etc.), pushing a stroller, in-line skating, canoeing, kayaking, rowing, swimming (with many types of strokes—e.g., breast, freestyle, butterfly, backstroke, etc.), or other similar information. In some instances, a traveler may travel a portion of a route in one travel mode (e.g., running) and a different portion of the route in a different travel mode (e.g., biking), such as when the traveler is training for a triathlon. In some such instances, the processor can receive multiple travel mode inputs. In some embodiments, the processor can receive a greater or lesser number of kinds of information related to the traveler and the route, such as those discussed elsewhere herein.

The processor can ask the runner for additional information, and the traveler can provide it, depending on his or her desired output. The traveler can have the option of learning how much fluid he or she lost in traveling the route (1320). If the traveler would like to know the amount of fluid lost, the processor could calculate the fluid loss (1325). The traveler can have the option of learning how many calories he or she burned in traveling the route (1330). If the runner would like to know the number of calories burned, the processor would calculate the number of calories burned (1335). In some embodiments, the fluid loss and/or the calories burned can be based on the personal information input, the route input, and/or the travel mode input. Some embodiments can provide runners with options for a greater or lesser number of outputs.

The processor can cause information to be displayed to the traveler. In some embodiments, the processor can cause the route to be displayed according to any of the ways discussed herein. In some embodiments, the processor can cause the information to be displayed that corresponds to the output options selected by the traveler (1340). For example, the processor can cause a fluid loss value and/or a calories burned value to be displayed to the traveler. In some embodiments, the processor can cause a fluid loss marker to be displayed to the traveler. The fluid loss marker can indicate that the traveler will need a certain amount of fluid at a certain point on the route in order to restore fluid levels. In some embodiments, the processor can cause a calories burned marker to be displayed to the traveler. The calories burned marker can indicate that the traveler will have burned a certain number of calories at a certain point on the route. In some embodiments, the processor can cause a link to be displayed to the traveler (1345). In some such embodiments, the link can be an advertisement. The method of FIG. 13 is illustrative. Any of the functionality and/or features discussed herein may be combined with some or all of the functionality and/or features of FIG. 13's method.

Figure 14:
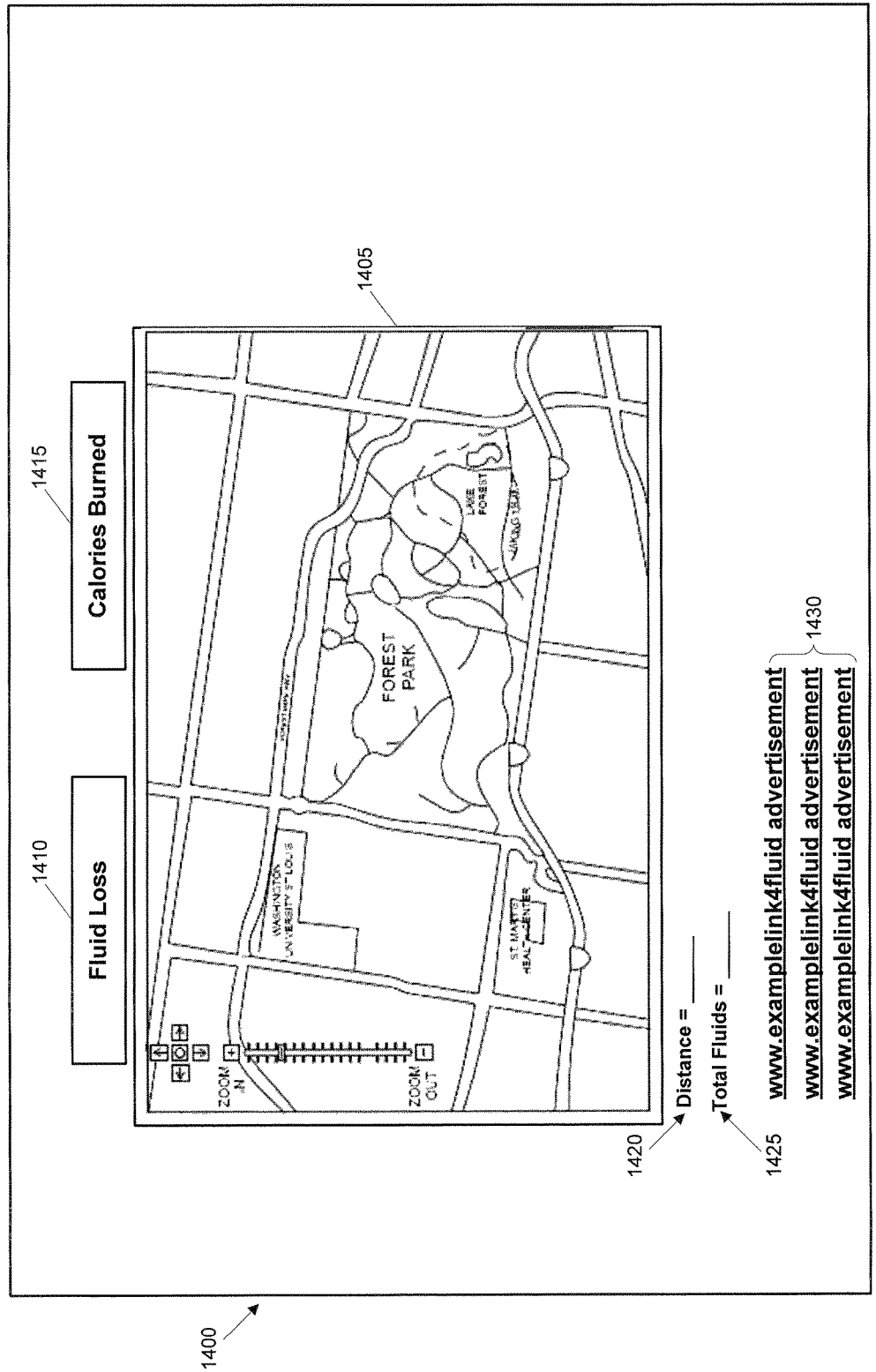
FIG. 14 shows an exemplary display.

FIGS. 14-16C show examples of displays that can be used in some embodiments of the present invention. FIG. 14 shows a display 1400 that can be used in connection with the exemplary method of FIG. 13. Referring again to FIG. 14, the display 1400 can include a map 1405, which can be provided according to any of the ways discussed herein. The display 1400 can include a fluid loss button 1410, which a traveler can actuate if he or she desires to know the fluid loss associated with a route. The display 1400 can include a calories burned button 1415, which a traveler can actuate if he or she desires to know the calories burned in traveling a route. The display 1400 can include a distance counter 1420 and a total fluids counter 1425 to show the traveler the distance and fluid loss, respectively, associated with a route. Some displays can include a total calories counter. The display can include one or more links 1430, which can link the traveler to an advertiser's website.

Figure 15A:
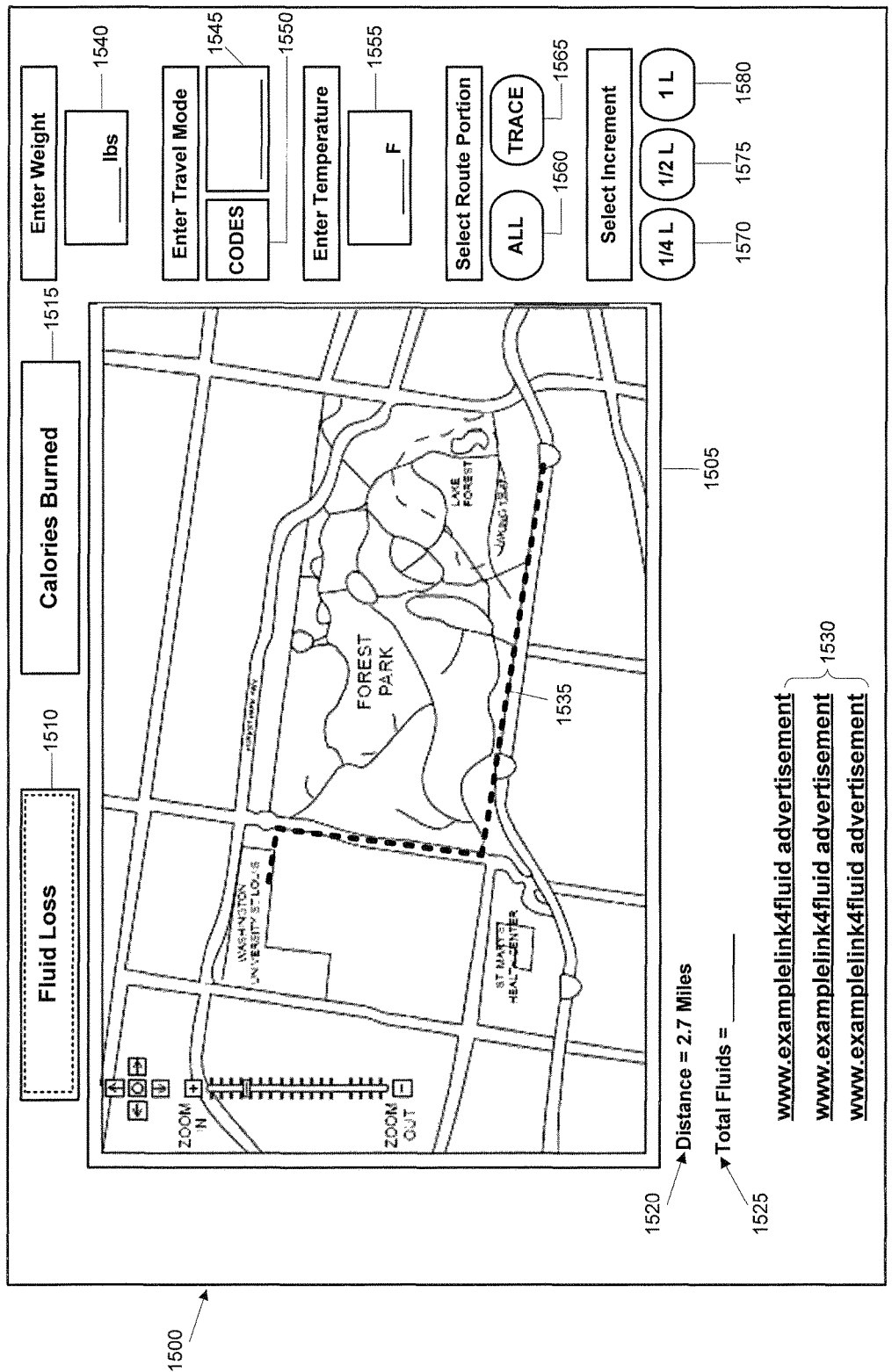
FIGS. 15A-15C show exemplary displays.
Figure 15B:
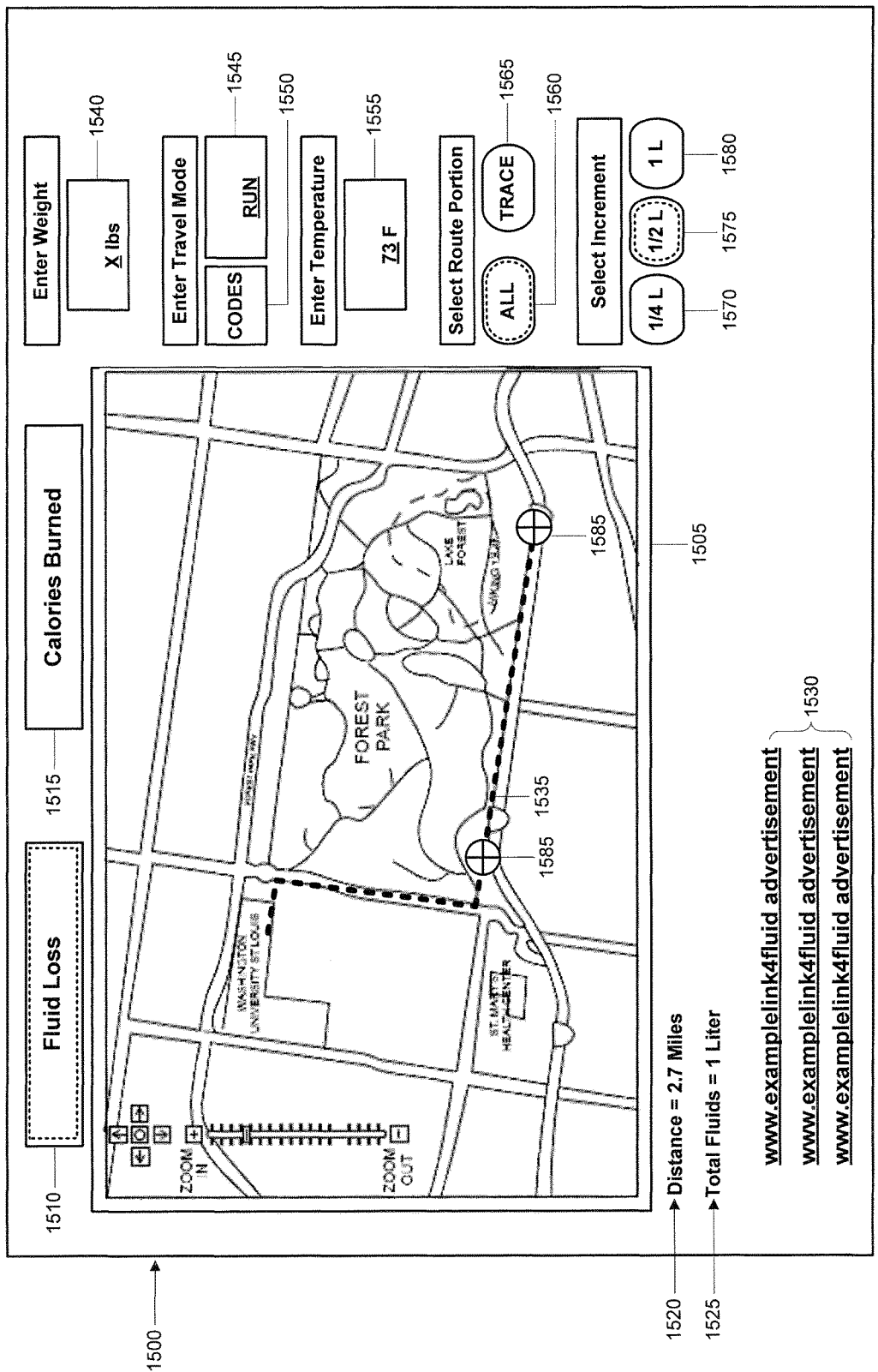
Figure 15C:
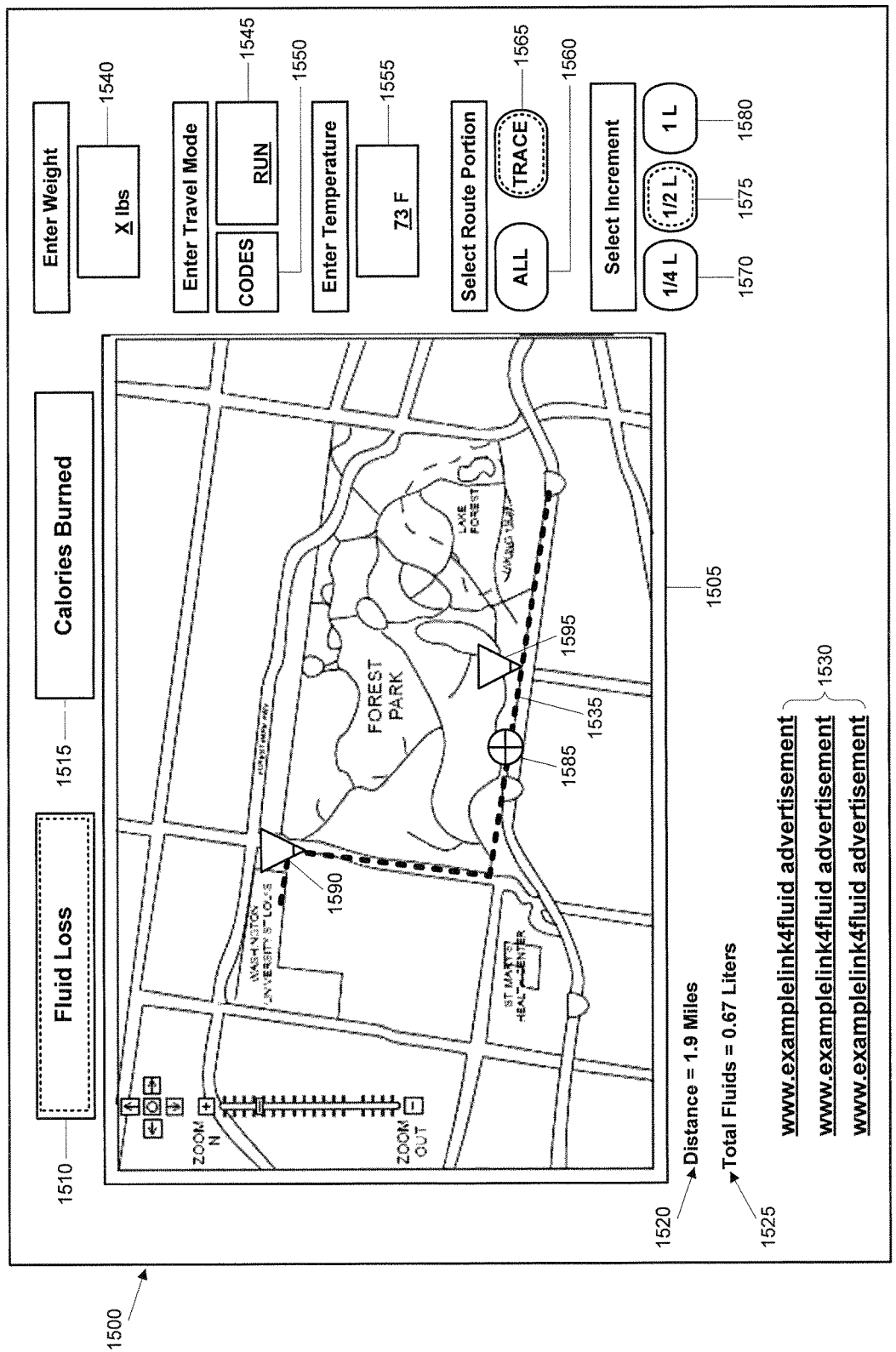

FIGS. 15A-15C show examples of displays 1500 similar to that of FIG. 14 in which the traveler has caused a route 1535 to be displayed and actuated the fluid loss button 1510. Upon actuation of the fluid loss button 1510, the display

1500 can cause one or more input fields to be displayed. The input fields can solicit information on which fluid loss value is to be based.

The exemplary input fields shown in FIG. 15A have not yet been populated, so FIG. 15A is be discussed first. The display 1500 of FIG. 15A includes a weight input field 1540. Displays can include input fields related to various aspects of personal information, such as those discussed elsewhere herein. The display 1500 can include a travel mode input field 1545. In some embodiments, travelers can populate the travel mode input field 1545 by using codes that correspond to particular travel modes. In some such embodiments, the codes can be listed in a drop-down menu that can be accessed by actuating a codes button 1550. The display 1500 can include a temperature input field 1555. Some embodiments include input fields that correspond to various weather parameters, such as those discussed elsewhere herein. To ascertain the traveler's selected route portion, the display 1500 can include an all button 1560—which a traveler can actuate to select the entire route 1535—and a trace button 1565—which a traveler can actuate to trace a selected portion of the route 1535. The traveler can select a portion of the route in any of the ways discussed herein. The display 1500 can include a ¼ liter button 1570, a ½ liter button 1575, and a 1 liter button 1580, which can allow travelers to choose whether to view fluid loss markers corresponding to every ¼ liter, every ½ liter, or every liter of fluid lost during the course of travel. Although liters are shown, any suitable unit of measurement can be used in connection with the fluid loss markers.

FIG. 15B shows the display 1500 of FIG. 15A with a traveler having populated the input fields, selected a route portion, and selected a fluid loss marker increment. The traveler has (a) indicated that he or she weighs X pounds in the weight input field 1540, (b) that he or she will be running the route 1535 in the travel mode input field 1545, and (c) that the temperature in which he or she will be running the route 1535 is 73° F. in the temperature input field 1555. The traveler has also indicated that he or she would like to view fluid loss information for the whole route 1560 by actuating the all button 1560 and that he or she would like to view fluid loss markers in ½ liter increments by actuating the ½ liter button 1575. Based on the traveler's input, a computer can determine that the traveler will lose 1 liter of fluid while traveling the route 1535, and the total fluid counter 1525 can so indicate. Based on the traveler's input, the display 1500 can include fluid loss markers 1585.

FIG. 15C shows the display 1500 of FIGS. 15A-15B with a traveler having provided identical input to the input fields and selected the same fluid loss increment as in FIG. 15B. In FIG. 15C, however, the traveler has indicated that he or she would like to view fluid loss information for only a portion of the route 1535 by actuating the trace button 1565. Upon actuating the trace button 1565, the traveler can position a starting point marker 1590 and an ending point marker 1595 on the route 1535 to designate the desired route portion. Based on the traveler's input, a computer can determine that the route portion's distance is 1.9 miles and that the associated fluid loss is 0.67 liters. The distance counter 1520 can display the route portion's distance, and the total fluids counter 1525 can display the associated fluid loss. Based on the traveler's input, the display 1500 can include a fluid loss marker 1585.

Figure 16A:
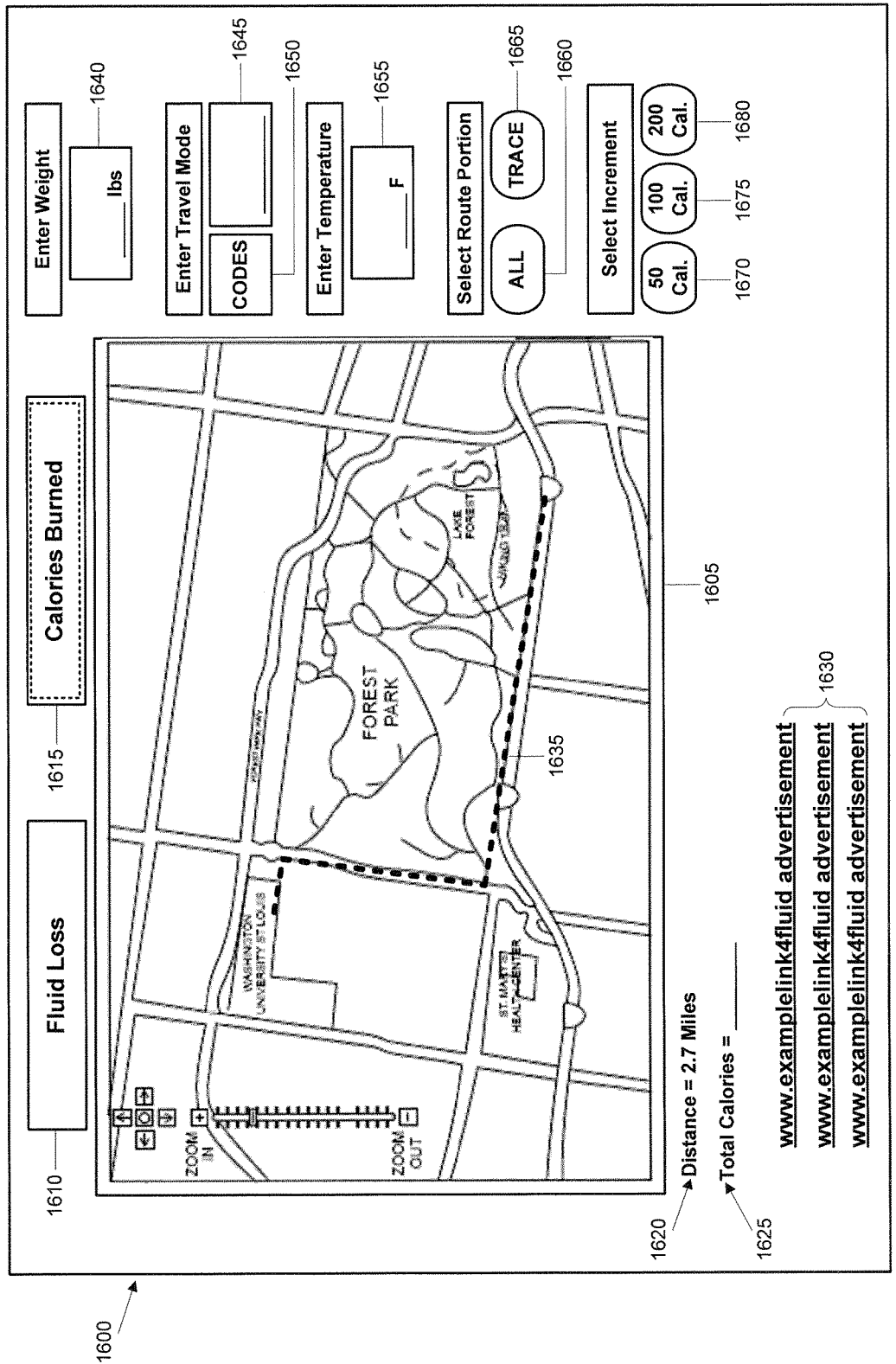
FIGS. 16A-16C show exemplary displays.
Figure 16B:
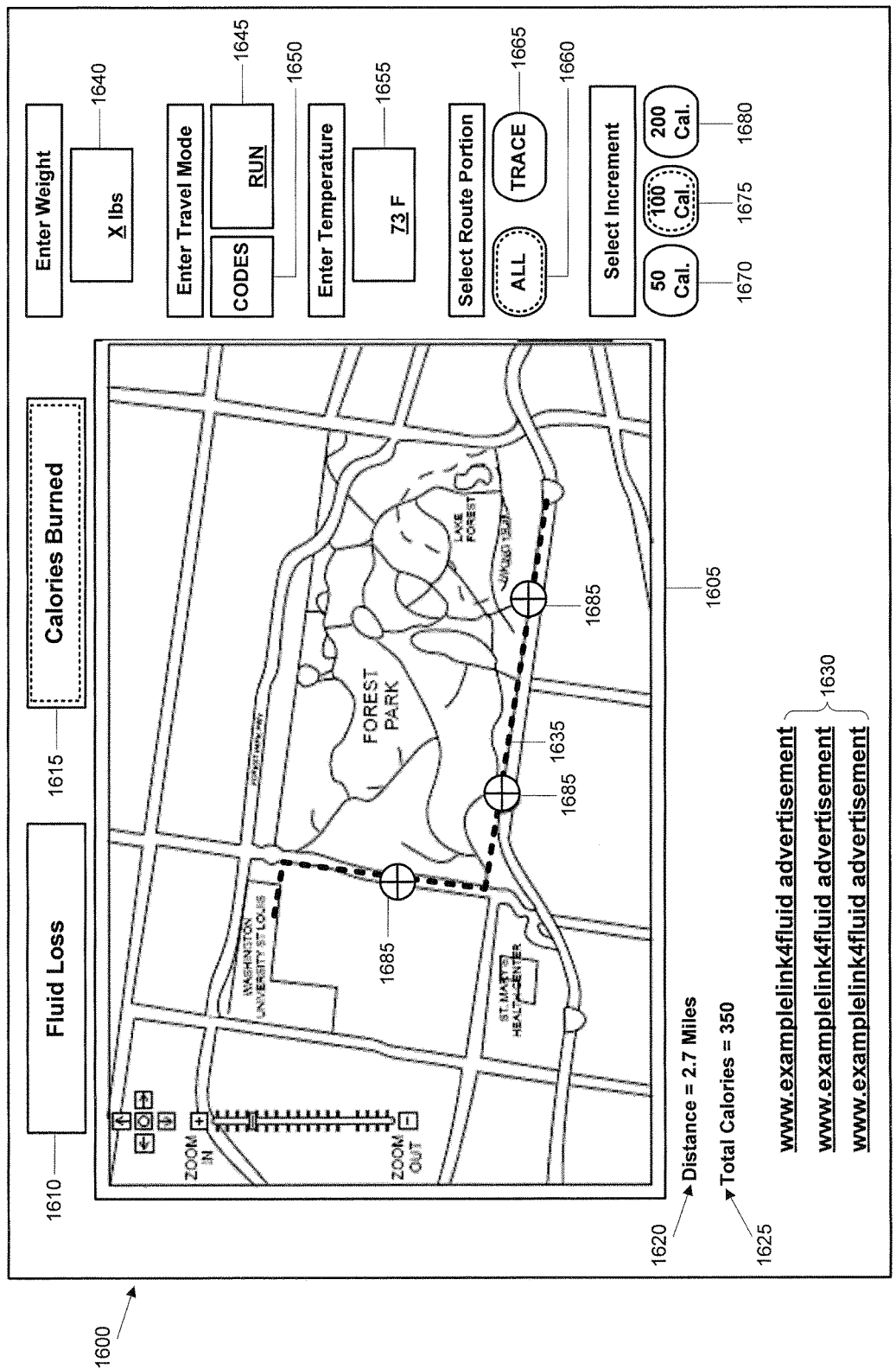
Figure 16C:
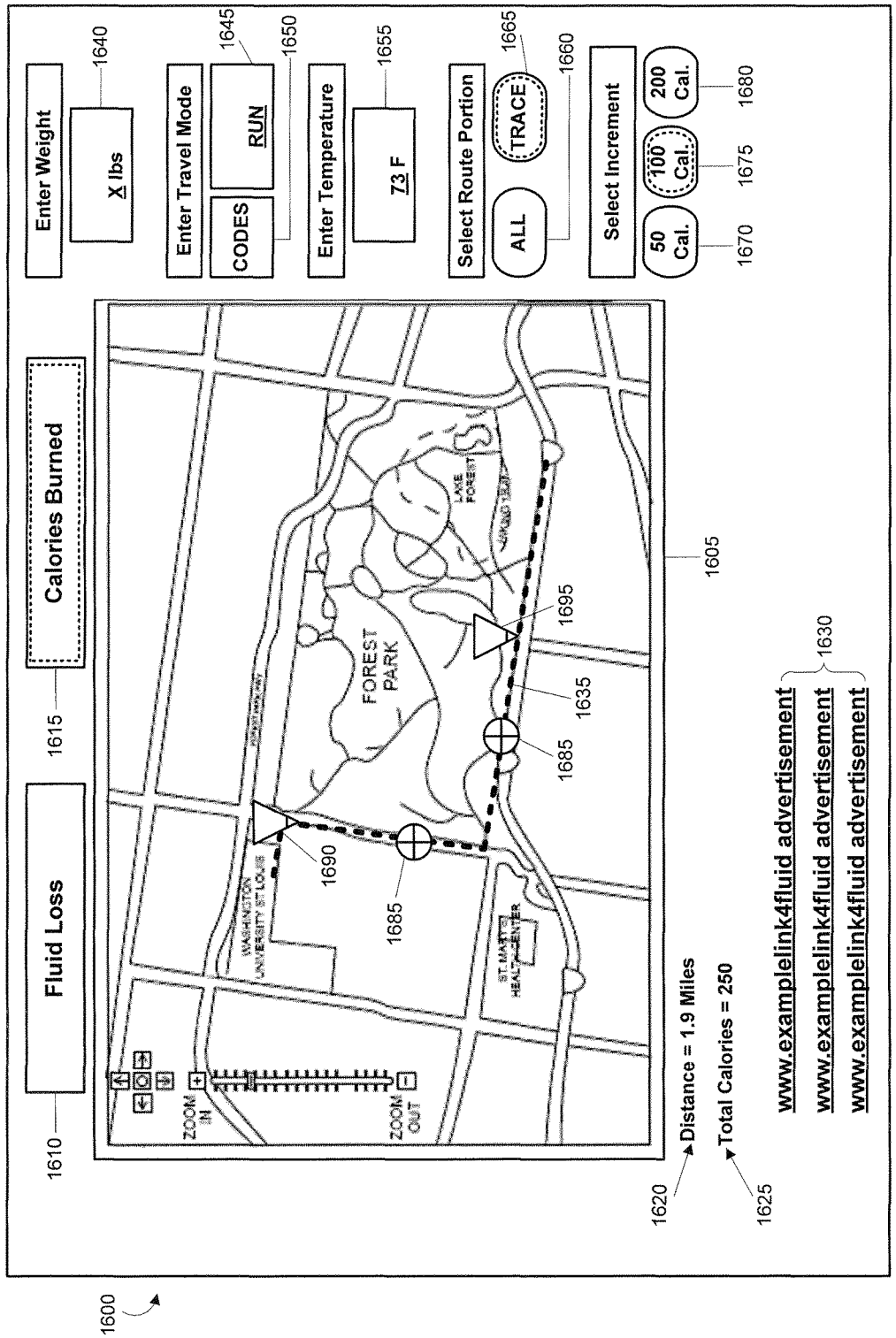

FIGS. 16A-16C show examples of displays 1600 similar to that of FIG. 14 in which the traveler has caused a route 1635 to be displayed and actuated the calories burned button 1610. Upon actuation of the calories burned button 1610, the display 1600 can cause one or more input fields to be displayed. The input fields can correspond to information on which the displayed calories burned value is based.

The examples of input fields shown in FIG. 16A have not yet been populated, so FIG. 16A will be discussed first. The display 1600 of FIG. 16A includes a weight input field 1640, a travel mode input field 1645, a codes button 1650, a temperature input field 1655, an all button 1660, and a trace button 1665 that are similar to those of FIGS. 15A-15C. Other input fields or buttons, such as those discussed in connection with FIGS. 15A-15C or elsewhere herein, can be included in the display 1600. The display 1600 can include a 50-calorie button 1670, a 100-calorie button 1675, and a 200-calorie button 1680, which can allow travelers to choose whether to view calories burned markers corresponding to every 50 calories, 100 calories, or 200 calories burned during the course of travel.

FIG. 16B shows the display 1600 of FIG. 16A with a traveler having populated the input fields, selected a route portion, and selected a calories burned marker increment. The information the traveler has provided in the input fields is identical to that of FIGS. 15A-15C. Referring again to FIG. 16B, the traveler has also indicated that he or she would like to view calories burned information for the whole route 1660 by actuating the all button 1660 and that he or she would like to view calories burned markers in 100-calorie increments by actuating the 100 calorie button 1675. Based on the traveler's input, a computer can determine that the traveler will burn 350 calories while traveling the route 1635, and the total calories counter 1625 can so indicate. Based on the traveler's input, the display 1600 can include calories burned markers 1685.

FIG. 16C shows the display 1600 of FIGS. 16A-16B with a traveler having provided identical input to the input fields and selected the same calories burned increment as in FIG. 16B. In FIG. 16C, however, the traveler has indicated that he or she would like to view calories burned information for only a portion of the route 1635 by actuating the trace button 1665. Upon actuating the trace button 1665, the traveler can position a starting point marker 1690 and an ending point marker 1695 on the route 1635 to designate the desired route portion. Based on the traveler's input, a computer can determine that the route portion's distance is 1.9 miles and that the traveler would burn 250 calories while traveling the route. The distance counter 1620 can display the route portion's distance, and the total calories counter 1625 can display the associated calories burned. Based on the traveler's input, the display 1600 can include calories burned markers 1685.

As used in this document, the term "computer" means a device, or multiple devices working together, that accepts information (in the form of digitalized data) and manipulates it for some result based on a program or sequence of instructions on how the data is to be processed. A computer may also include the means for storing data for some necessary duration.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Thus, embodiments of the route selection system are disclosed. One skilled in the art will appreciate that the route selection system can be practiced with embodiments other than those disclosed. The disclosed embodiments are presented for purposes of illustration and not limitation, and the present invention is limited only by the claims that follow.

What is claimed is:

1. A method of selecting a route for a user, the method comprising:
   presenting, by a routing computer, a map on a display operably coupled to the routing computer;
   receiving, by the routing computer, a start location and an end location via user input;
   receiving, by the routing computer, a plurality of routing criteria;
   determining, by the routing computer, a plurality of routes between the start location and the end location based on the routing criteria;
   displaying, by the routing computer, at least one of the plurality of routes on the map;
   receiving, by the routing computer, route editing instructions via user input; and
   modifying, by the routing computer, at least one of the plurality of routes based on the editing instructions, to create one or more modified routes.

2. The method of claim 1, wherein the plurality of routing criteria are selected from the group consisting of lighting criteria, travel surface criteria, population density criteria, weather criteria, distance criteria, speed criteria, calorie criteria, time criteria, elevation change criteria, and landmark criteria.

3. The method of claim 1, further comprising:
   determining a calorie count for each alternative route based ON the alternative route's distance, the user's weight, and elevation change corresponding to the alternative route.

4. The method of claim 1, wherein the routing criteria comprise a minimum calorie count, and wherein the calorie count corresponding to each of the displayed alternative routes is greater than the minimum calorie count.

5. The method of claim 3, wherein the calorie count for each alternative route is further based on weather conditions along the alternative route.

6. The method of claim 1, wherein the plurality of routing criteria includes weather criteria, and wherein the map is time-animated to show weather changes along each of the displayed alternative routes as a function of time.

7. The method of claim 6, wherein the map is time-animated based on a predicted travel rate corresponding to the user.

8. The method of claim 1, wherein the plurality of routing criteria includes an indication of a landmark and each of the plurality of alternative routes includes a location corresponding to the landmark.

9. A method of assisting a user in selecting a route, the method comprising:
   providing, by a routing computer, a user interface comprising a map for display on a user computer;
   receiving, by the routing computer, an indication that the user is specifying a start location and an end location;
   updating, by the routing computer, the user interface to include one or more characteristics of the route;
   receiving, by the routing computer, route editing instructions via the user interface;
   creating, by the routing computer, a modified route between the start location and the end location based on the route and the routing criteria; and
   presenting, by the routing computer, the modified route on the map.

10. The method of claim 9, further comprising:
    receiving, by the routing computer, an indication that a portion of the modified route has been selected on the map.

11. The method of claim 10, further comprising:
    displaying, by the routing computer, the selected portion of the modified route in a first color on the map; and
    displaying, by the routing computer, a remaining portion of the modified route that does not include the selected portion in a second color.

12. The method of claim 10, further comprising:
    presenting one or more characteristics of the selected portion on the user interface.

13. The method of claim 12, wherein the one or more characteristics includes a distance value corresponding to the route.

14. The method of claim 10, further comprising:
receiving, by the routing computer, a request to erase the selected portion from the modified route; and
updating the map to display the modified route with the selected portion removed.

15. The method of claim 9, wherein the one or more routing criteria are selected from the group consisting of lighting criteria, travel surface criteria, population density criteria, weather criteria, distance criteria, speed criteria, calorie criteria, time criteria, elevation change criteria, and landmark criteria.

16. The method of claim 9, wherein the one or more of routing criteria includes weather criteria and the map is time animated to show weather changes along the modified route as a function of time.

17. A system of selecting a route for a user, the system comprising:
   a receiver configured to receive a route between a start location and an end location via user input to a map and further configured to receive a plurality of routing criteria and route editing instructions;
   a processor configured to determine a plurality of routes between the start location and the end location based on at least one of the plurality of routing criteria and the route editing instructions; and
   a display configured to present the map and further configured to present at least one of the plurality of routes on the map.

* * * * *